US012601422B2

(12) United States Patent
Lehnert et al.

(10) Patent No.: US 12,601,422 B2
(45) Date of Patent: Apr. 14, 2026

(54) MONITORING AN OPERATING CONDITION OF AN HVAC FLOW REGULATOR

(71) Applicant: BELIMO Holding AG, Hinwil (CH)

(72) Inventors: Frank Lehnert, Rüti (CH); Marc Thuillard, Uetikon am See (CH); Silvio Grogg, Wetzikon (CH); Pascal Hertrich, Zürich (CH); Patrick Reissner, Herrliberg (CH); Urs Niederhauser, Pfungen (CH); Lukas Eigenmann, Aathal-Seegräben (CH)

(73) Assignee: BELIMO Holding AG, Hinwil (CH)

( * ) Notice: Subject to any disclaimer, the term of this patent is extended or adjusted under 35 U.S.C. 154(b) by 148 days.

(21) Appl. No.: 18/410,395

(22) Filed: Jan. 11, 2024

(65) Prior Publication Data

US 2024/0142020 A1     May 2, 2024

Related U.S. Application Data

(63) Continuation-in-part of application No. PCT/EP2022/069666, filed on Jul. 13, 2022.

(51) Int. Cl.
*F16K 37/00* (2006.01)
*F24F 11/89* (2018.01)
*F24F 140/40* (2018.01)

(52) U.S. Cl.
CPC .......... *F16K 37/0066* (2013.01); *F24F 11/89* (2018.01); *F24F 2140/40* (2018.01)

(58) Field of Classification Search
CPC ... F16K 37/0066; F24F 11/89; F24F 2140/40; F24F 11/64; F24F 11/88; F24F 13/10; F24F 11/38
See application file for complete search history.

(56) References Cited

U.S. PATENT DOCUMENTS 3,851,299 A * 11/1974 Wood ....................... G01V 1/28
                                                    367/90
9,845,965 B2   12/2017 Lehnert et al.
                (Continued)

FOREIGN PATENT DOCUMENTS

CN        218584123 U  *  3/2023
CN        221571571 U  *  8/2024
                (Continued)

OTHER PUBLICATIONS

International Search Report Corresponding to PCT/EP2022/069666 mailed Oct. 21, 2022.
                (Continued)

*Primary Examiner* — Daniel Pihulic
(74) *Attorney, Agent, or Firm* — Finch & Maloney PLLC

(57)                  ABSTRACT

A method of detecting an operating condition of a controllable flow regulator in a fluid flow channel of an HVAC system, comprising transmitting a sonic signal, from a sonic transmitter, directly or indirectly to the flow regulator, the sonic signal being distinguished from background noise by being at least one of: (i) modulated according to a modulation schema, (ii) an ultrasonic signal, (iii) a frequency selected to be away from background noise, receiving a signal from a sonic receiver for detecting the transmitted signal after interacting with the flow regulator; and determining, in an electronic signal processor, the operating condition of the flow regulator on the basis of the signal received.

23 Claims, 18 Drawing Sheets

(56) References Cited

U.S. PATENT DOCUMENTS

|  |  |  |  |
|---|---|---|---|
| 10,094,659 B2 | 10/2018 | Schröder |  |
| 2014/0067135 A1 * | 3/2014 | Lehnert .................... | F24F 11/62 |
|  |  |  | 700/276 |
| 2024/0142020 A1 * | 5/2024 | Lehnert .................... | F24F 11/64 |

FOREIGN PATENT DOCUMENTS

|  |  |  |  |  |
|---|---|---|---|---|
| DE | 199 44 047 A1 | 4/2001 |  |  |
| DE | 102012101416 A1 * | 8/2013 | ............ | G01S 15/88 |
| EP | 2 697 572 B1 | 2/2014 |  |  |
| RU | 2816283 C1 * | 3/2024 |  |  |
| WO | WO-2023285562 A1 * | 1/2023 | ............. | F24F 11/88 |

OTHER PUBLICATIONS

Written Opinion Corresponding to PCT/EP2022/069666 mailed Oct. 21, 2022.

* cited by examiner

OPERATE RX TO RECEIVE
BACKGROUND NOISE IN MULTIPLE
CHANNELS OR BROADBAND          110

ANALYSE RX SIGNAL
TO DETERMINE
BACKGROUND NOISE SPECTRUM          112

SELECT OPERATING
FREQUENCY AWAY FROM
BACKGROUND NOISE          114

(INSTALL TX AND RX
TRANSDUCERS FOR SELECTED
OPERATING FREQUENCY)          116

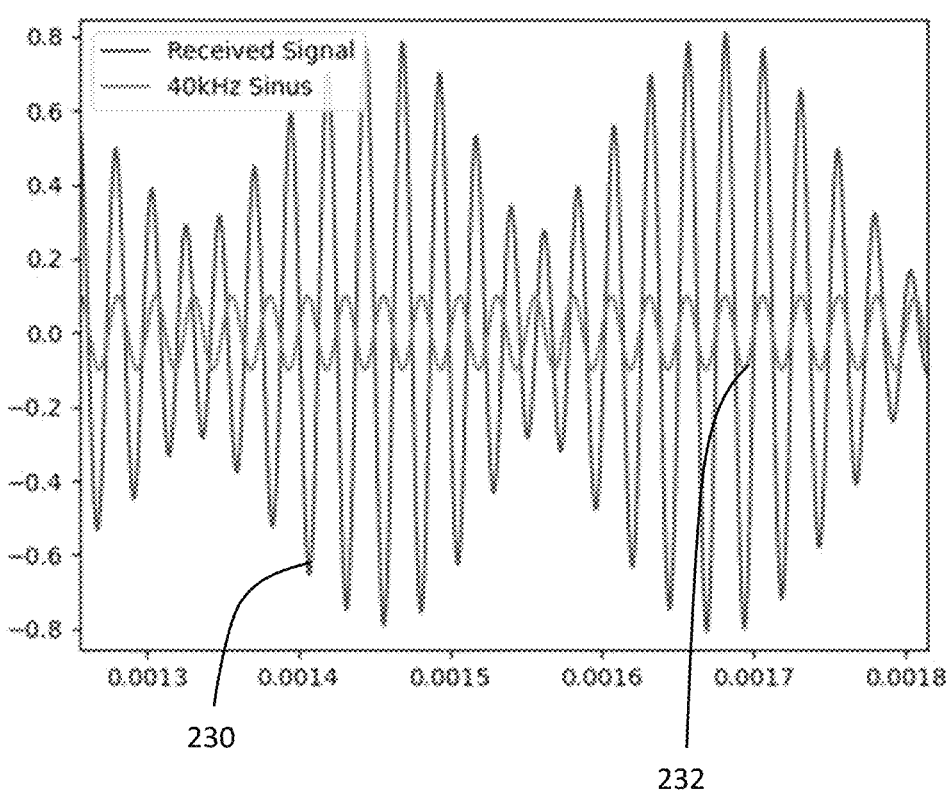
230
232
Fig. 19
Fig. 20
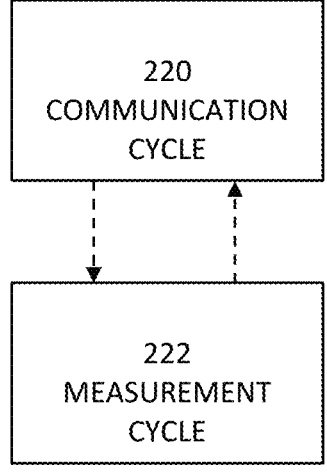

MONITORING AN OPERATING CONDITION OF AN HVAC FLOW REGULATOR

FIELD OF THE DISCLOSURE

The present disclosure relates to the field of HVAC (Heating, Ventilation, Air Conditioning) systems, and in particular to monitoring an operating condition of a fluid flow regulator in an HVAC system.

BACKGROUND TO THE DISCLOSURE

HVAC systems installed in buildings or other installations are expected to achieve high standards of safety and reliability. HVAC systems also contribute to a building's fire safety and environment control. Monitoring and testing of the system is important for maintaining reliability and safety standards. Laws often require regular checks to be carried out on the system's performance.

One aspect of monitoring and testing a HVAC system concerns the functioning of electronically controlled flow regulators, e.g. valves and dampers, that regulate flow of fluids (gases and/or liquids, such as air and/or water). The efficiency and safety of the system may depend on the regulators functioning correctly. Fire dampers are examples of controlled regulators intended to close off air passages in the HVAC system in the event of a fire, to avoid fire and smoke spreading. Smoke control dampers are examples of controlled regulators similarly intended to open to allow extraction of smoke and fumes through a ventilation duct. Other controllable flow regulators are also important to everyday ventilation, to efficiency of heating and air conditioning, and to maintaining the integrity of controlled atmosphere environments, such as clean rooms, laboratories and hospitals.

The conventional way of carrying out checks on flow regulators is by manually accessing, inspecting and testing each flow regulator in situ, to verify that the flow regulator does function as required, closes tightly, and opens properly. However, manual testing is slow, labour intensive and subject to human error. Many flow regulators are placed in locations making physical access difficult, further exacerbating problems. If checks are carried out relatively infrequently (for example, every 6 or 12 months), a malfunction may occur that is not detectable for a long time, potentially creating a hidden safety or environmental hazard.

EP-A-2697572 describes a promising alternative approach of automated functional diagnosis, including using an acoustic sensor within the flow path for monitoring whether a flow regulator is potentially leaking when in its closed condition.

It would be desirable to enhance the versatility and/or efficacy of automated monitoring of an HVAC flow regulator and/or to address or mitigate remaining technical challenges.

SUMMARY OF THE DISCLOSURE

Aspects of the disclosure are identified in the claims.

Additionally or alternatively, a first aspect of the disclosure provides a method of detecting an operating condition of a controllable flow regulator in a fluid flow channel of an HVAC system. The method comprises the steps of:
(a) transmitting a sonic signal, from a sonic transmitter, directly or indirectly to the flow regulator,
(b) receiving a signal from a sonic receiver for detecting the transmitted signal after interacting with the flow regulator; and (c) determining, in an electronic signal processor, the operating condition of the flow regulator on the basis of at least the signal received in the receiving step (b).

Additionally or alternatively, a similar second aspect of the disclosure provides an HVAC flow regulator monitoring system for monitoring an operating condition of a controllable flow regulator in a flow channel of an HVAC system, the monitoring system comprising:
a sonic transmitter for transmitting a sonic signal directly or indirectly to the flow regulator, and an electronic driver for driving the transmitter;
a sonic receiver for detecting the transmitted signal after interacting with the flow regulator; and outputting a received signal; and
an electronic signal processor coupled to the receiver, and responsive at least to the received signal, for determining the operating condition of the flow regulator.

In the first and/or second aspect, the sonic signal may be distinguished from background noise by being at least one of: (i) modulated according to a modulation schema, (ii) an ultrasonic signal, (iii) a frequency selected to be away from background noise.

Such a technique provides considerable advantages compared to prior art. The inventors have appreciated that acoustic monitoring can be impacted negatively by an HVAC system being an unpredictably noisy acoustic environment. Background acoustic noise may be generated by the HVAC equipment itself, especially equipment in need of maintenance or replacement. Background noise may also come from the building or environment in which the HVAC system is installed. The techniques of the present invention can enable the impact of background noise to be mitigated, and enable the sonic signal to be more easily discriminated in the received signal and processed to determine the operating condition.

The modulation schema, if used, may be selected as at least one of: frequency modulation; amplitude modulation; a coded pattern of signal bursts; phase keying; phase modulation. As well as facilitating discrimination from background noise, a modulation schema also enables timing information to be derived from the received signal. Timing information may be derived from any suitable portion of the modulation schema, for example, the mark-space ratio of signal bursts, the periodicity of signal bursts or between consecutive signal bursts, at least one of the start and end of each signal burst, or regular clocking forming part of the modulation schema. Deriving timing information is a significant advantage because it can enable the transmitting and receiving to be performed independently, for example, by different circuitry that is not directly connected electrically. At least one of the receiving and processing can be synchronised to the transmitting using timing information derived from the received signal. Important applications of this technique enable, for example, a time of flight to be calculated for the signal to travel from the transmitter to the receiver, and/or enable electrical separation of the transmitter and receiver on opposite sides of, for example, a firewall, thereby avoiding any need to drill an undesirable aperture in the fire-wall for an electrical connection.

Phase-shift keying and/or phase modulation (for example, binary phase-shift keying (BPSK)) is a technique in which the phase of a carrier signal is varied according to a message signal (the message signal being digital or analogue for phase-shift keying or phase modulation, respectively). An advantage of phase keying and/or phase modulation is its robustness against noise. This can be an advantage in cases of poor signal to noise ratio, such as high levels of background noise, or for providing good sensitivity to only small amplitude signals arriving at the receiver. The amplitude of the sonic signal may be small, for example, if there is only a very small leakage path at the flow regulator that allows only a small fraction of the sonic energy to pass to the receiver. Another situation in which the amplitude of the sonic signal may be small is when the flow channel duct has a relatively large cross-sectional area, such that the sonic energy from the transmitter is relatively diffuse over the entire area. Empirically, this can occur, for example, in a flow channel duct having a lateral dimension of at least 30 cm. This is in contrast to the situation in a relatively smaller size duct, in which the sonic energy is significantly more concentrated.

The sonic signal may be modulated to carry a digitally coded signal. Digitally coding the modulated signal adds an additional characteristic of the modulated signal that can be used to assist in discriminating the transmitted signal, even when the signal to noise ratio is very poor, for example, less than one (meaning the noise and signal have the same power) or less than zero decibel (a ratio of 1 is zero decibel).

In some embodiments, the digitally coded signal may comprise (at least part of the time) a fixed code (for example, representing invariable data). Additionally or alternatively, the digitally coded signal may, in some embodiments, comprise (at least part of the time) a variable code (for example, for transmitting variable information). The coding scheme may comprise one or more selected from the group consisting of: convolutional code, trellis code, and turbo code.

Additionally or alternatively, the digitally coded signal may comprise at least one of coding redundancy and error correction information. Such a technique can further facilitate decoding of transmitted information, even when the signal to noise ratio is very poor, for example, less than one (meaning the noise and signal have the same power) or less than zero decibel (a ratio of 1 is zero decibel).

In a preferred embodiment, the digitally coded information comprises a reference bit sequence, wherein auto-correlation values for all non-zero shifts of the reference bit sequence do not exceed 25% of an auto-correlation value at zero shift. Preferably, the auto-correlation values for all non-zero shifts of the reference bit sequence do not exceed 10% of an auto-correlation value at zero shift. More preferably, the auto-correlation values for all non-zero shifts of the reference bit sequence do not exceed 5% of an auto-correlation value at zero shift.

In a preferred embodiment, the step (c) of determining comprises the steps of determining a multitude of cross-correlation values between the signal received in the receiving step (b) and the reference bit sequence, wherein each cross-correlation value in the multitude of cross-correlation values is determined at a different shift; and generating an indication of at least one of a current and a forthcoming malfunction, if a maximum cross-correlation value of the multitude of cross-correlation values exceeds a pre-defined cross-correlation value threshold.

A reference bit sequence in which the auto-correlation values for all non-zero shifts of the reference bit sequence do not exceed 10% of the auto-correlation value at zero shift is an approximation of a scaled Kronecker delta. For example, the reference bit sequence is a pseudo-random bit sequence (PRBS) or a Barker code. For example, the reference bit sequence comprises 13 digits.

By way of example, such a reference bit sequence is impressed on a carrier frequency. Then, the resulting sonic signal is transmitted by a transmitter through a flow channel, passes through a flow regulator, and is received at a sonic receiver. The receiver records both the sonic signal sent by the transmitter, but also noise from other sources. By determining cross-correlation values at all possible shifts between the reference bit sequence and the sonic signal received, the signal transmitted from the transmitter to the receiver can be distinguished from the noise. If the flow regulator lets through a larger proportion of the sonic signal than expected for a functioning flow regulator, e.g. when the flow regulator is not tight when closed and thus malfunctioning, the maximum cross-correlation value determined will be above the pre-defined cross-correlation value threshold. Values below or at the threshold indicate a functioning flow regulator.

The use such a sonic signal carrying a reference bit sequence that is cross-correlated with upon receipt with the reference bit sequence to determine the portion of the sonic signal that passes through the flow regulator was found by the inventors to be particularly advantageous over the prior art. This method further reduces the impact of background noise in the signal received and allows identification of the sonic signal in it. In particular, the method makes it possible to recognise the smallest changes in the state of the flow regulator, as the sonic signal is significantly amplified by determining the cross-correlation. Thus, the versatility and/or efficacy of automatic monitoring of an HVAC flow controller is improved compared to the prior art.

Additionally or alternatively to use of modulation, the ultrasonic signal, if used, can provide several advantages compared to an audible acoustic signal. One advantage is that an ultrasonic signal is not audible or perceptible to people working in the building in which the HVAC system is installed, and so people will not be disturbed by hearing the transmitted signal. Another advantage is that the higher frequency of an ultrasonic signal (shorter wave period than an audible signal) enables greater time resolution (e.g. time of flight) in signal measurements. More information can be derived in a shorter time interval, leading, for example, to more accurate and/or more rapid determination of the operating condition. A further advantage is that ultrasonic signals are more sensitive even to the presence of small leakage paths at the flow regulator, than are audible acoustic signals. In other words, even a small imperfection in fluid-tightness may be more easily detected using an ultrasonic signal than an audible signal. A yet further advantage is that an ultrasonic signal can enable optional calculation of fluid flow rate through the flow regulator (when the regulator is open to flow), using variation in signal time of flight between transmitter and receiver. This enables the same transducers to provide multiple measuring functions, without the cost and complication of a dedicated flow sensor.

In addition to the above advantages, ultrasonic signals are subject to greater damping resulting in more rapid attenuation with distance, compared to audible frequencies. Such attenuation is especially noticeable in air and other gaseous fluids. Background noise in the ultrasonic frequency range is also subject to damping and attenuation. Using ultrasonic frequencies can therefore provide a local signal environment that can be substantially less affected by distant sources of background noise, than using audible frequencies.

The ultrasonic signal, if used, may optionally be in a frequency range greater than 20 KHz, up to 10 MHz. In some embodiments, the ultrasonic frequency may optionally be at least 20.5 KHz, optionally at least 21 KHz, optionally at least 25 KHz. The frequency or frequency range may be chosen based on a number of factors, optionally including the nature of the fluid in the flow path, and/or optionally the nature of the environment including background noise (discussed below). Although not limiting, for air or other flow gases, the ultrasonic signal may be in a frequency range selected from: greater than 20 KHz up to 300 KHz, optionally from 25 KHz to 300 KHz, optionally greater than 20 KHz up to 100 KHz, optionally from 25 KHz to 100 KHz. Also, although not limiting, for water or other flow liquids, the ultrasonic signal may be in a frequency range selected from 1 MHz to 10 MHz, optionally from 1 MHz to 5 MHz. Signals outside the example ranges for different types of fluids may also be used.

In a particular embodiment, the sonic signal is (i) modulated according to a modulation schema; and (ii) an ultrasonic signal. Optionally, the signal carries digitally coded information to further improve resilience to noise, and enable operation even in poor signal-to-noise ratio conditions.

Additionally or alternatively to the above, the frequency selected to be away from background noise, if used, may provide a further alternative even optionally using non-ultrasonic signals (e.g. signals in a frequency range of 20 Hz to 20 KHz) and/or non-modulated signals (e.g. continuous signals). The frequency may be selected dynamically in situ by measuring or analysing noise in respective frequency spectrums, and selecting an operating frequency away from noise. The noise analysis may optionally be repeated periodically to ensure that the operating frequency is optimal with respect to the current noise spectrum. Alternatively, noise may be measured or analysed at installation of the HVAC system, and an appropriate frequency selected and thereafter fixed.

Although the options of a modulation schema, an ultrasonic signal, and a frequency selected to be away form background noise, may be used independently, it will be appreciated that additional synergistic advantages may result from combining any two or all three options together.

Additionally or alternatively to any of the above, the transmitted signal may be transmitted directly to the flow regulator, by at least one sonic transmitter coupled to a flow control member of the flow regulator.

Additionally or alternatively, the transmitted signal may be transmitted indirectly to the flow regulator by at least one sonic transmitter transmitting the sonic signal into the flow channel on a first side of the flow regulator. Optionally, the sonic transmitter is coupled to an exterior of a conduit defining the flow channel, and transmits the sonic signal through the conduit wall into the flow channel. Such an exterior sonic transmitter may be a clamp-on unit, optionally facilitating mounting to an existing conduit without needing adaptation of the conduit wall.

Additionally or alternatively to any of the above, at least one sonic receiver may be coupled to the flow control member of the flow regulator. Additionally or alternatively, at least one sonic receiver may be coupled to the flow channel, optionally to an exterior of a conduit defining the flow channel and receiving the sonic signal through the conduit wall. Such an exterior sonic receiver may be a clamp-on unit, optionally facilitating mounting to an existing conduit without needing adaptation of the conduit wall.

In some embodiments, at least one sonic receiver may be positioned to detect the sonic signal from the flow channel on an opposite second side of the flow regulator to the transmitter. The received signal may then be processed as a component of the transmitted signal transiting the flow regulator, from one side to the other.

Additionally or alternatively, at least one sonic receiver may be positioned to detect the sonic signal from the flow channel on the same first side of the flow regulator as the transmitter. The received signal may then be processed as a component of the sonic signal reflected back by the flow regulator.

More than one sonic transmitter and/or more than one sonic receiver may be used per flow regulator. For example, multiple sonic transmitters and/or multiple sonic receivers may be arranged at different positions around a flow axis; and/or multiple sonic transmitters and/or multiple sonic receivers may be arranged on opposite sides of the same flow regulator. A first transmitter on a first side of the flow regulator may transmit a first signal in one direction to an opposite second side of the flow regulator, and a second transmitter on the second side may transmit a respective second signal in the opposite direction to a receiver on the first side. The first and second signals may be distinguished from each other (e.g. by frequency separation or time division multiplexing). Bi-directional signal transmission can provide a technique for avoiding any direction-dependency in the influence on the sonic signal. Bi-directional signal transmission can also enhance accuracy in, for example, calculation of fluid flow rate, if used. It is envisaged that a sonic transmitter (e.g. a single transmitter unit) may transmit the sonic signal via one or more flow paths to multiple flow regulators to provide a common sonic signal source usable to monitor operating conditions at multiple flow regulators.

As used throughout, the term "operating condition" covers one or more measurables, optionally plural measurables in parallel. The term includes one or more of: an operating state of the flow regulator, for example, any of open, closed, fluid-tight, non-fluid-tight; and/or a performance condition of the flow regulator, for example, whether operation of the flow regulator is compromised by a performance-limiting condition or malfunction condition, such as but not limited to any of worn, broken, obstructed, in need of inspection.

In some embodiments, the operating condition is or comprises one or more of:

a degree of fluid-tightness of the flow regulator when in a closed condition;

(ii) the presence or absence of a leakage path through the flow regulator when in a closed condition;

(iii) at least one of a closure state and a closed position of the flow regulator;

(iv) detection that the flow regulator is in a closed state;

(v) a physical position of a movable flow control member of the flow regulator, optionally a physical position of a movable vane of the flow regulator;

(vi) evolution over time of the physical position of a movable flow control member when cycled to the closed condition;

(vii) evolution over time of leak paths through the flow regulator when cycled to the closed condition;

(vii) an indication of where around a perimeter of a flow control member a leakage path is detected to exist, based on a time interval between emitting of the signal into the flow channel, and reception of the signal from the flow channel;

(vi) an amount of hysteresis in at least one of the flow regulator and an actuator of the flow regulator;

(vii) at least one of distortion and wear of a seal component of the flow regulator;

(viii) indication of at least one of a current and a forthcoming malfunction of at least one of the flow regulator and an actuator of the flow regulator;

(ix) the degree of intactness of a flow control member of the flow regulator;

(x) indication of foreign matter in the flow channel in the vicinity of the flow regulator selected from the group consisting of accumulation of deposits, and contamination of the fluid, and pollution of the fluid;

(xi) a physical position of a movable vane of the flow regulator;

(xii) at least one of distortion and wear of at least one seal component of the flow regulator selected from the group consisting of a seal member, a seal seat, and a seal liner.

In some embodiments, processing of the signal from the sonic receiver may comprise the step of processing to determine one or more of:

presence or absence of the transmitted signal in a signal received from the flow channel;

(ii) an amplitude of the received signal;

(iii) a comparison of the received signal, and at least one threshold;

(iv) a degree of attenuation of the received signal compared to the transmitted signal, as the flow regulator cycles between an open condition and a closed condition;

(v) at least one of a time interval and time of flight, between transmission of the signal into the flow channel, and reception of the transmitted signal from the flow channel;

(vi) at least one of a respective phase, phase difference and phase range for a plurality of phase-distributed signal components received from the flow channel;

(vii) a respective signal to noise ratio for each of a plurality of different operating frequency channels;

(viii) a measurement of noise different from the transmitted signal, optionally to facilitate selection of an operating frequency removed from background noise;

(ix) a comparison of the received signal, and at least one threshold for discriminating between fluid-tight and non-fluid-tight conditions;

(x) a comparison of the received signal, and at least one threshold for discriminating between obstructed and unobstructed flow path conditions;

(xi) a respective signal to noise ratio for each of a plurality of different operating frequency channels for selecting between operating frequency channels in situ.

Any possible processing technique or techniques may be used to discriminate the sonic signal in the received signal, to reject background noise, and to determine the operating condition. Merely by way of example, processing may include any one or more of: filtering, artificial intelligence, pattern recognition, data modelling, etc. The modulation schema, if used, may be selected such that the modulation schema improves processing efficacy for any of signal discrimination, noise rejection and determining the operating condition.

Additionally or alternatively to any of the above, a closely related third aspect provides an HVAC flow regulator actuator for actuating a flow regulator for regulating flow in a flow channel of an HVAC system, the actuator comprising:

i. an electro-mechanical driver for driving movement of an actuator member, for actuating the flow regulator; and ii. controller circuitry comprising:

iii. at least one output coupled to the electro-mechanical driver for commanding operation of the electro-mechanical driver; and iv. at least one input for receiving an input signal from a sonic receiver for receiving a sonic signal from at least one of the flow channel and the flow regulator;

v. wherein the controller circuitry is operable to:

vi. identify whether the input signal comprises a component corresponding to at least one of a predetermined modulation schema and an ultrasonic signal component, and vii. in response to the identification step, determine an operating condition associated with at least one of the flow regulator and the actuator.

Additionally or alternatively to any of the above, a fourth aspect of the invention provides a method of operation of apparatus for monitoring an operating characteristic of a controllable flow regulator in a flow channel of an HVAC system, the method comprising the steps of:

(a) during a communication cycle of operation, operating a first sonic transducer (e.g. sonic transceiver) disposed on a first side of the flow regulator to transmit a sonic signal to communicate operatively with a second sonic transducer (e.g. sonic transceiver) disposed on a second side of the flow regulator to transmit operative information from one side of the flow regulator to the other;

(b) during a measurement cycle of operation, operating the first and second sonic transducers (e.g. sonic transceivers), to detect an operating condition of the flow regulator.

The operative information may, for example, be or comprise any of: synchronisation information; command information (for example, commanding the measuring cycle); result information (for example, after completion of the measuring cycle).

The method may comprise the step of performing the communication cycle while the flow regulator is in a non-closed (e.g. at least partially or fully open condition), to provide a good and/or or unobstructed path for the sonic signal to travel across the flow regulator.

The method may comprise the step of performing the measurement cycle of operation while the flow regulator is set to, or is being moved to a closed condition. The measurement cycle may be configured to test whether any gaps or leak paths exist when the flow regulator is closed.

The method may optionally further comprise the step of at least partly opening the flow regulator at some time after the measurement cycle, to start a new communication cycle of operation.

This technique offers the possibility of using sonic signal transmission and reception in different ways. For example, when the flow regulator is known to be open (or non-closed) to provide a good signal transmission path, the sonic signal can be used for communication of operative information through the flow regulator and/or from one side to the other. This can avoid the need for dedicated electrical connections having to be provided crossing the flow regulator, which is especially advantageous in the case of flow regulators at fire or smoke barriers. When the flow regulator is closed, the sonic signal can be used to test or measure an operating characteristic of the flow regulator, such as whether there are any gaps or leak paths at the flow regulator. The communication cycle can optionally be used to command operation of the measurement cycle of operation, or to communicate the results of the measurement cycle.

As used throughout, the term "flow regulator" may be any device for adjusting an orifice to regulate fluid flow in a flow path, for example, a damper, a flap, or a valve. The flow regulator may be of a type having two discrete states, for example, open and closed; or the flow regulator may of a type having three or more discrete states, for example, open, closed and one or more intermediate states; or the flow regulator may be of a type that defines a continuously variable orifice size, for example continuously variable between fully open and fully closed. The actuatable part of the flow regulator may, for example, be any movable element such as a damper blade, a valve ball, valve plug, valve flap, etc. The fluid may be a liquid (e.g. water and/or glycerol), or the fluid may be a gas (e.g. air). The flow regulator may, by way of example, be a butterfly valve or ball valve (for liquid) or a flap valve (for air). The flow regulator may, by way of example, be a fire-damper or a smoke-damper.

Additionally or alternatively to any of the above-mentioned embodiments, the sonic transmitter is connected with a first side of the flow regulator with at least one of an air hose and a sound reflector. The sonic receiver is connected with a second side of the flow regulator opposite to the first side, also, with at least one of an air hose and a sound reflector. The air hose(s) and sound reflector(s) are used to guide the sonic signals from the sonic transmitter to the first side of the flow regulator in the flow channel and from the second side of the flow regulator to the sonic receiver.

At least parts of the air hoses can be guided to the desired locations using thin tubes, for example thin metal tubes.

The use of such air hoses and sound reflectors enables a particularly simple installation of an HVAC regulator actuator, as the sonic transmitters and sonic receivers can be accommodated in the housing of the actuator.

In a particularly advantageous embodiment, the sonic transmitter and the sonic receiver are realized by means of a single sonic transceiver, including both transmission and reception capability, for bidirectional operation.

Although certain features have been highlighted above and in the appended claims, protection is claimed for any novel feature or idea described herein and/or illustrated in the drawings whether or not emphasis has been placed thereon.

BRIEF DESCRIPTION OF THE DRAWINGS

FIG. 19 is a schematic graph showing the use of phase-shift keying with an ultrasonic transducer, with a 40 kHz reference tone for illustration purposes.

FIG. 20 is a schematic diagram illustrating different operating cycles of a sonic transmission and reception system for communication and for measuring an operating characteristic of a flow regulator.

DETAILED DESCRIPTION OF PREFERRED EMBODIMENTS

Figure 1:
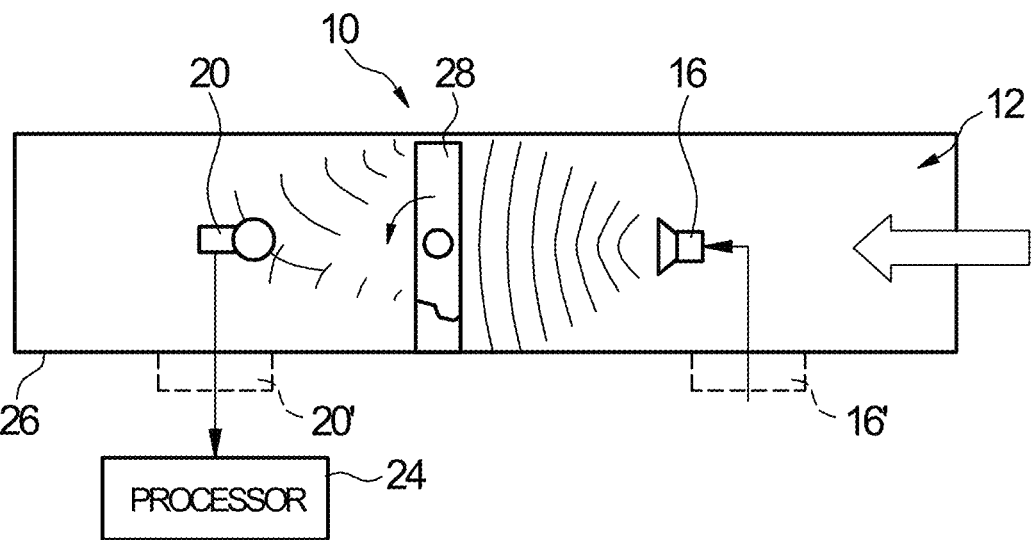
FIG. 1 is a schematic block diagram illustrating a first example layout of components for determining an operating condition of a flow regulator of an HVAC system.

Non-limiting embodiments of the disclosure are now described, by way of example only, with reference to the accompanying drawings. The same reference numerals are used to denote corresponding features, whether or not described in detail.

Figure 4:
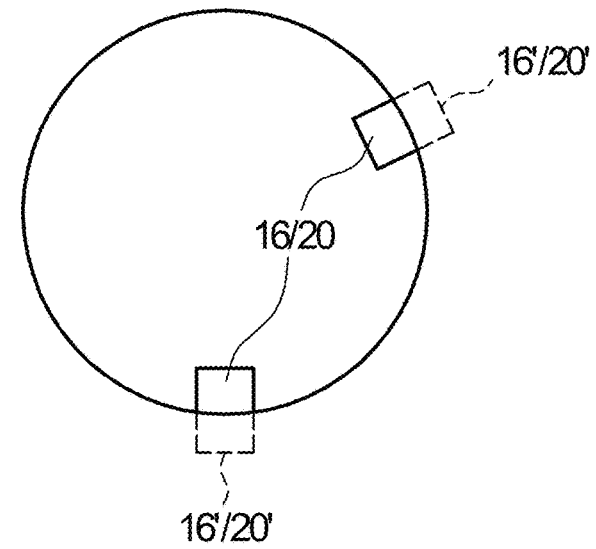
FIG. 4 is a schematic block diagram illustrating a fourth example of component layout using multiple sonic transmitters and/or multiple sonic receivers.
Figure 5:
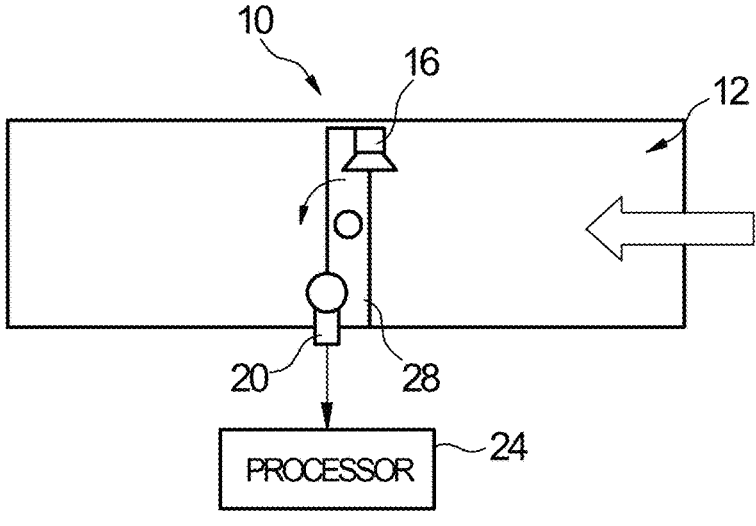
FIG. 5 is a schematic block diagram illustrating a fifth example layout of components for determining an operating condition of a flow regulator of an HVAC system.
Figure 6:
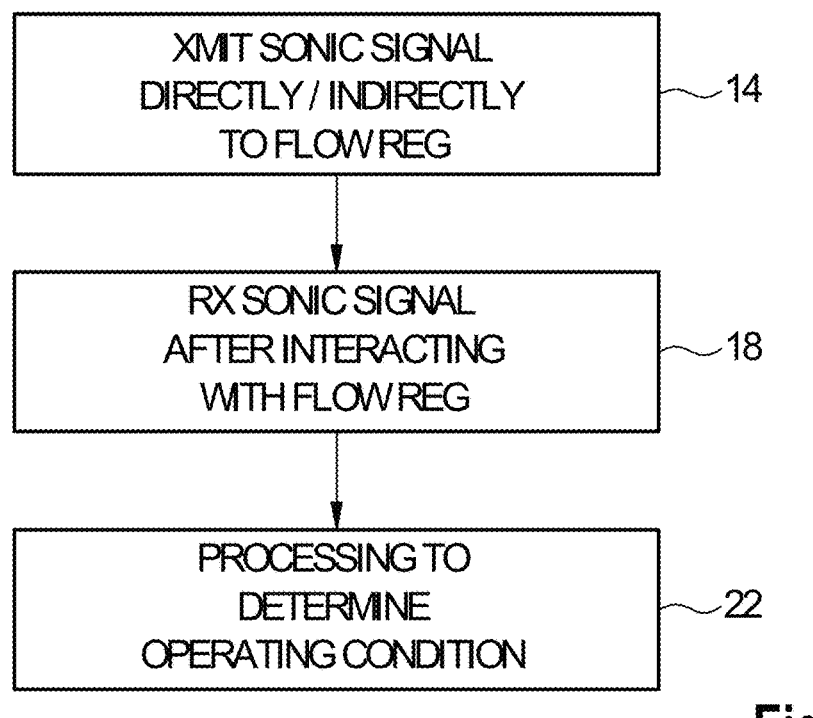
FIG. 6 is a schematic flow diagram illustrating a general method of detecting an operating condition of a controllable flow regulator of an HVAC system.

Referring to FIGS. 1-6, the embodiments illustrate techniques for detecting an operating condition of a controllable flow regulator 10 in a fluid flow channel 12 of an HVAC system. The fluid may, for example, be a gas (e.g. air) or it may be a liquid (e.g. water and/or glycol-water mixtures). FIGS. 1-5 illustrate different optional layouts of certain components (discussed in more detail later), and FIG. 6 illustrates a methodology for performing such detection of the operating condition. Referring generally to these figures, method step 14 comprises the step of transmitting a sonic signal from at least one sonic transmitter 16, directly or indirectly to the flow regulator 10. A significant feature of at least some of the techniques described herein is that the sonic signal is distinguished from background noise by being at least one of (optionally at least two, and further optionally all three of):

modulated according to a modulation schema, (ii) an ultrasonic signal, (iii) a frequency selected to be away from background noise.

A driver circuit (not shown) may be provided to drive the sonic transmitter 16 with an appropriate signal. In some embodiments, the driver circuit is integrated as part of the sonic transmitter 16 to form a self-contained and/or integrated unit. Alternatively, the driver circuit may form part of exterior circuitry, optionally part of an actuator circuit for commanding an electro-mechanical actuator for actuating the flow regulator and/or optionally part of a signal processor 24 (described below).

Method step 18 comprises the step of receiving a signal from at least one sonic receiver 20 for detecting the transmitted signal after interacting with the flow regulator 10. Method step 22 comprises the step of determining, in an electronic signal processor 24, the operating condition of the flow regulator on the basis of at least the signal received at step 18.

As illustrated later below, the above characteristics of the sonic signal enabling the sonic signal to be distinguished from background noise provide important advantages in being able to discriminate the sonic signal detected by the receiver 16, and to interpret the received signal to provide information about the operating condition.

When a modulation schema is implemented, the modulation schema may, for example, be selected as at least one of: frequency modulation; amplitude modulation; a coded pattern of signal bursts; phase keying; phase modulation. As well as facilitating discrimination from background noise, a modulation schema also facilitates timing information to be derived from the received signal.

When an ultrasonic signal is implemented, the ultrasonic signal may optionally be in a frequency range selected from: 20 KHz to 300 KHz, optionally 20 KHz to 100 KHZ, for example, for air or other flow gases; or 1 MHz to 10 MHz, optionally 1 MHz to 5 MHz for water or other flow liquids. Use of an ultrasonic signal can avoid the signal causing audible disturbances, e.g. to people in the building. Use of an ultrasonic signal can also reduce the impact of background noise from distant sources, because especially in air or other flow gases, background noise will in heavily damped or attenuated. As illustrated later, use of an ultrasonic signal can also provide surprisingly good sensitivity for detecting even small leak paths at the flow regulator when the regulator is closed, and/or also the ability to measure fluid flow rate when the regulator is open.

Different layouts of the sonic transmitter 16 and sonic receiver 20 with respect to the flow regulator 10 are envisaged. For example, referring to FIGS. 1-4, the sonic transmitter 16 may be configured to transmit the sonic signal indirectly to the flow regulator 10 via the flow channel 12. The sonic receiver 20 may be configured to detect the sonic signal via the flow channel 12. The sonic transmitter 16 and/or the sonic receiver 20 may be mounted within the flow channel as illustrated, or optionally or preferably mounted against an interior surface (not shown) of the conduit 26 defining the flow channel 12. A further possible arrangement is for the sonic transmitter 16 and/or the sonic receiver 20 to be mounted to an exterior surface of the conduit 26, and to transmit or receive, respectively, the sonic signal through the conduit wall. An example exterior transmitter position 16' for the sonic transmitter 16 and an example exterior receiver position 20' for the sonic receiver 20 are illustrated in phantom. The sonic transmitter 16 and the sonic receiver 20 may then be configured as clamp-on units that can be clamped to or around the exterior of the conduit, without having to create a mounting aperture in the conduit wall, or pass the unit into the conduit interior space. This can greatly simplify installation and maintenance of the sonic transmitter 16 and the sonic receiver 20.

In FIG. 1, the sonic transmitter 16 is arranged on a first side of the flow regulator 10, and the sonic receiver 20 is arranged on a second opposite side of the flow regulator 10 for detecting a component of the sonic signal transiting the flow regulator 10. Such an arrangement is especially, but not exclusively, suitable for detecting an operating condition relating to whether the flow regulator is open or closed, and/or whether a fluid-tight seal is established, as illustrated later below.

Figure 2:
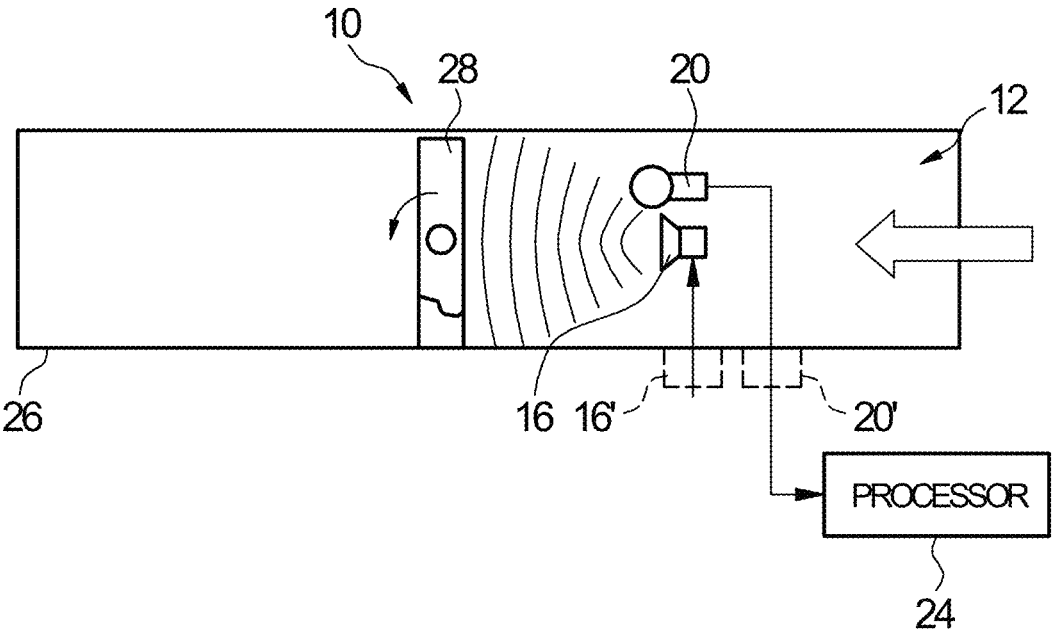
FIG. 2 is a schematic block diagram illustrating a second example layout of components for determining an operating condition of a flow regulator of an HVAC system.

In FIG. 2, the sonic receiver 20 is arranged on the same (e.g. first) side of the flow regulator 10 as the sonic transmitter 16, for detecting a component of the sonic signal reflected by the flow regulator. Such an arrangement is especially, but not exclusively, suitable for detecting the position (e.g. operating angle) of the flow regulator 10 and/or for detecting the degree of intactness of the flow regulator 10.

Although FIGS. 1 and 2 illustrate that the sonic transmitter 16 and sonic receiver 20 may be at generally matching positions with respect to the (e.g. axis of) the flow channel 12, in other embodiments, the sonic transmitter 16 and sonic receiver 20 may be in non-matching positions. In some embodiments, the sonic transmitter 16 and sonic receiver 20 may be mounted at different angular positions around the periphery of the conduit 26, such that angular positions of the sonic transmitter 16 and sonic receiver 20 are offset. For example, the positions may be offset by about 180°, with one being mounted near, e.g. the top of the conduit, and the other being mounted near, e.g. the bottom of the conduit. Here top and bottom are labels used to illustrate two regions offset by about 180°, but other non-aligned, and/or diagonal, arrangements of the sonic transmitter 16 and sonic transducer 20 are also envisaged.

Also, although FIGS. 1 and 2 illustrate the positions of the sonic transmitter 16 and sonic receiver 20 to be generally equidistant, the distances may be different. In some embodiments, the sonic transmitter 16 may have a different angle of beam divergence compared to the acceptance angle of the sonic receiver 20. The distance away from the flow regulator 10 may be set so as to ensure that the beam divergence of the transmitted signal can cover the entire width of the flow regulator, and/or the acceptance angle for the received signal can include the entire width of the flow regulator. For example, the beam divergence of the sonic transmitter 16 may be narrower than the acceptance angle of the sonic receiver 20. The sonic transmitter 16 may therefore be spaced further from the flow regulator 10 than is the sonic receiver 20. A further alternative is discussed below with respect to FIG. 4.

Figure 3:
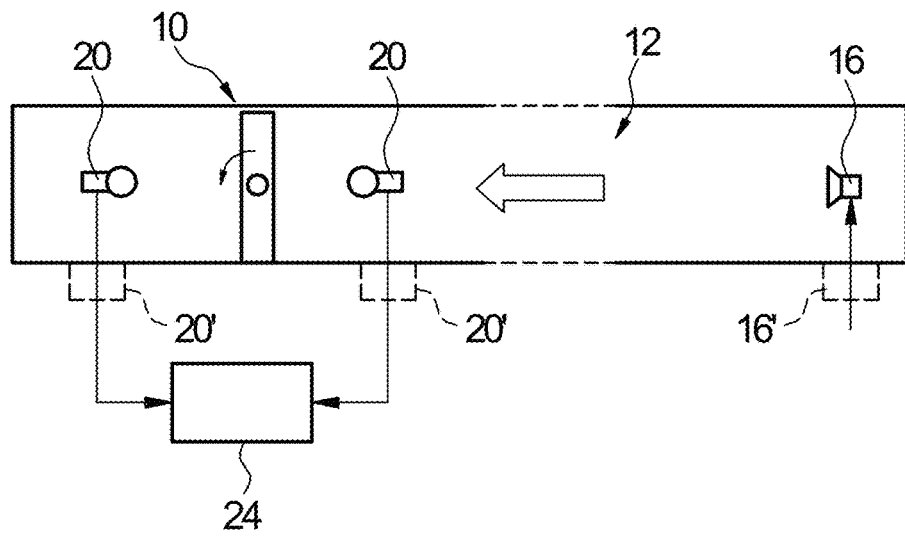
FIG. 3 is a schematic block diagram illustrating a third example layout of components for determining an operating condition of a flow regulator of an HVAC system.

In FIG. 3, the sonic transmitter 16 is positioned in the flow channel at a position (e.g. a central or strategic position in the HVAC system) that is remote from the flow regulator 10. The same transmitter 16 may act as a common sonic signal source for supplying the sonic signal to multiple flow regulators 10 via distributed flow channels. Each flow regulator 10 may optionally have its own sonic receiver(s) 20 for detecting the operating condition of the respective flow regulator 10. Alternatively, the same receiver 20 may act as a common sonic receiver for multiple flow regulators 10 coupled in a network. For example, in a series network, only one flow regulator at a time, namely the regulator to be tested, is closed, and the others are fully open. Each valve is tested in turn. The cost can thus be reduced compared to separate transducers for each flow regulator.

Additionally or alternatively, multiple sonic transmitters 16 and/or receivers 20 may be provided for a flow regulator 10, optionally on opposite sides of the flow regulator 10. Multiple sonic receivers on opposite sides 20 may detect both transiting and reflected sonic signal components, and/or may provide a reference for the amplitude of the sonic signal in the flow channel 12 before interacting with the flow regulator 10.

In FIG. 4, multiple sonic transmitters 16 and/or multiple sonic receivers 20 are disposed at different respective positions around the flow axis of the flow channel 12. Such an arrangement can provide multi-dimensional characterisation of the operating condition to be detected. Optionally, if multiple transmitters are used, the transmitters may be configured to transmit at different frequencies from one another, to enable the respective signals to be separated and interpreted by the sonic receiver(s). Additionally or alternatively, the multiple transmitters may be time division multiplexed to transmit at different times or in different transmission time windows, to avoid interference between multiple sonic signal transmissions. Additionally or alternatively, multiple transmitters and receivers may provide an alternative arrangement enabling devices with relatively narrow transmitted signal beam divergence and/or relatively narrow received acceptance angle to be placed close to the flow regulator to improve signal-to-noise ratios, while collectively ensuring that the entire width of the flow regulator is covered functionally by a combination of at least one sonic transmitter and at least one sonic receiver.

The same principles as above for separating transmissions from two sonic transmitters 16 may also be applied to the arrangement described above for FIG. 3 in which multiple transmitters 16 may be disposed at least one on each side of the flow regulator 10 in addition to a respective receiver 20 on each side. Such an arrangement provides for bidirectional transmission of a sonic signal across the flow regulator 10.

In FIG. 5, the sonic transmitter 16 is coupled to a flow control member 28 of the flow regulator 10, for directly transmitting the sonic signal to the flow regulator 10. The sonic receiver 20 is also coupled to the flow control member 28, optionally at a different position from the transmitter 16 and/or on an opposite face of the flow control member 28 with respect to the transmitter 16. Such an arrangement is especially, but not exclusively, suitable for detecting the operating condition on the basis of how the flow control member 28 is constrained against vibration. For example, if the flow control member 28 is tightly seated in a seal around its entire periphery, the peripheral edge will be constrained against vibration. Alternatively, if the edge is not tightly seated in a seal, the edge will be less constrained against vibration, and this different response of the flow control member 28 can be detected by the sonic receiver 20.

As illustrated in selected examples below, the operating condition may be or may comprise one or more of:

a degree of fluid-tightness of the flow regulator when in a closed condition;

(ii) the presence or absence of a leakage path through the flow regulator when in a closed condition;

(iii) a closure state and/or a closed position of the flow regulator;

(iv) detection that the flow regulator is in a closed state;

(v) a physical position of a movable flow control member of the flow regulator, optionally a physical position of a movable vane of the flow regulator;

(vi) evolution over time of the physical position of a movable flow control member when cycled to the closed condition;

(vii) evolution over time of leak paths through the flow regulator when cycled to the closed condition;

(vii) an indication of where around a perimeter of a flow control member a leakage path is detected to exist, based on a time interval between emitting of the signal into the flow channel, and reception of the signal from the flow channel;

(vi) an amount of hysteresis in the flow regulator and/or an actuator of the flow regulator;

(vii) distortion and/or wear of a seal component of the flow regulator, optionally, a seal member and/or a seal seat and/or a seal liner;

(viii) indication of a current and/or forthcoming malfunction of the flow regulator and/or an actuator of the flow regulator;

(ix) the degree of intactness of a flow control member of the flow regulator;

(v) indication of foreign matter in the flow channel in the vicinity of the flow regulator, for example: accumulation of deposits; and/or contamination of the fluid; and/or pollution of the fluid.

In some embodiments, the processing circuit 24 may process of the signal from the sonic receiver to determine one or more of characteristics, such as any of:

presence or absence of the transmitted signal in a signal received from the flow channel;

(ii) an amplitude of the received signal;

(iii) a comparison of the received signal, and at least one threshold, optionally (a) a threshold for discriminating between fluid-tight and non-fluid-tight conditions, and/or (b) a threshold for discriminating between obstructed and unobstructed flow path conditions.

(iv) a degree of attenuation of the received signal compared to the transmitted signal, as the flow regulator cycles between an open condition and a closed condition.

(v) a time interval and/or time of flight, between transmission of the signal into the flow channel, and reception of the transmitted signal from the flow channel;

(vi) a respective phase and/or phase difference and/or phase range for a plurality of phase-distributed signal components received from the flow channel;

(vii) a respective signal to noise ratio for each of a plurality of different operating frequency channels, optionally for selecting between operating frequency channels in situ.

(viii) a measurement of noise different from the transmitted signal, optionally to facilitate selection of an operating frequency removed from background noise.

Figure 7:
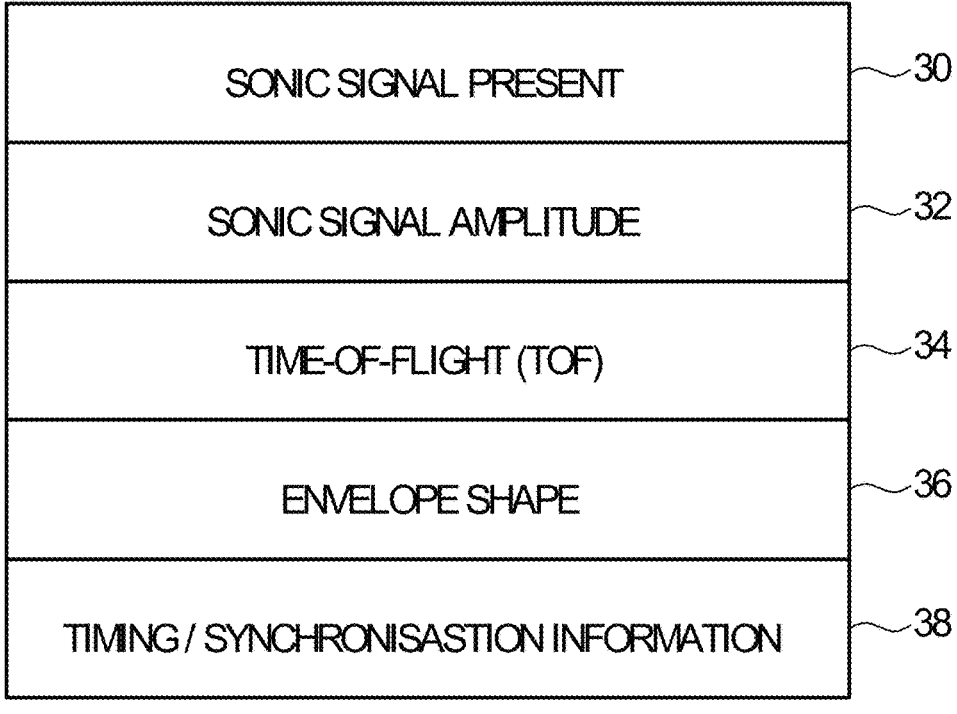
FIG. 7 is a schematic information table illustrating example sonic signal characteristics for use in determining an operating condition of a controllable flow regulator of an HVAC system.

Some example characteristics 30-38 explained further below are tabulated in FIG. 7. One or more characteristics may be used independently of each other, or the operating condition may be determined based on two more characteristics. Additionally or alternatively, the change in one or more characteristics may be determined as the flow regulator moves from open to closed (or from closed to open). Additionally or alternatively, a historical evolution or trend over time of one or more characteristics may be determined.

For example, one characteristic 30 may be whether or not the sonic signal can be detected (e.g. discriminated as being present) in the signal from the sonic receiver 20.

Another characteristic 32 may be the amplitude of the sonic signal in the received signal. Amplitude can be an important characteristic for evaluating how much of the sonic signal is transiting or is reflecting from the flow regulator, indicative for example, of the size of the gap or orifice at the flow regulator. Amplitude (e.g. amplitude trend over time) can also provide an indication of transmitter and/or receiver performance compared to expected performance over the life of the transducers. For example, deviation in performance may indicate actual or forthcoming malfunction. Amplitude (e.g. amplitude trend over time, for example, measured consistently at a certain predetermined opening angle) may provide an indication of a mechanical problem, and/or the degree of pollution and/or accumulation of debris in the flow channel. Pollution or debris tends to reduce the sonic signal amplitude.

Another characteristic 34 may be the time of flight (TOF) for the sonic signal to travel from the sonic transmitter 16 to the sonic receiver 20 (or for the sonic signal to travel from one side of the flow regulator to the other, for example, in the arrangement of FIG. 3). Time of flight can be an important characteristic for evaluating the travel path (e.g. the length of the travel path) of the sonic signal as it transits or is reflected by the flow regulator. Time of flight can be evaluated to determine where around the periphery a leak path may exist, as well as evaluating the operating position of a flow control member of the flow regulator. Time of flight can also be evaluated to measure the fluid flow rate when the flow regulator is open.

Another characteristic 36 may be the envelope shape of the received signal compared to the transmitted signal. Envelope shape can provide useful information about the number of different signal paths, and relative path lengths, along which the sonic signal may transit the flow regulator or may reflect from the flow regulator. In general, there may be multiple signal paths from the transmitter 16 to the receiver 20, including reflections from internal surfaces of the conduit 26 and the flow regulator 10. Some of the signal paths may have different lengths, creating relative phase lag between the signal paths. Superposition of signals arriving at the receiver 20 along these different paths can lead to an amplitude variation at the receiver. The envelope shape of this amplitude variation is a useful indicator, independently or in combination with other characteristics. For example, relative orientation or position of the flow control member of the flow regulator may thereby be determined, and/or the size of the opening at the flow regulator may be indicated. The smaller the size of any gaps, the fewer sonic signal paths that will coincide at the receiver.

If envelope shape is not needed, and/or in order to determine or measure amplitude independent of envelope shape, the amplitude signal may be mathematically integrated over a time interval. Integration can cancel out temporal fluctuations, to provide an amplitude determination relatively independent of reflections and different signal paths.

Another characteristic 38 may be synchronisation or timing derived from the received signal. Such synchronisation or timing information may be especially significant when there is no direct electrical connection between the sonic transmitter and the sonic receiver. Synchronisation/timing information may nevertheless be derived independently on the receiver side (or by the processing circuitry 24) based, for example, on the modulation schema, if used.

Figure 8A:
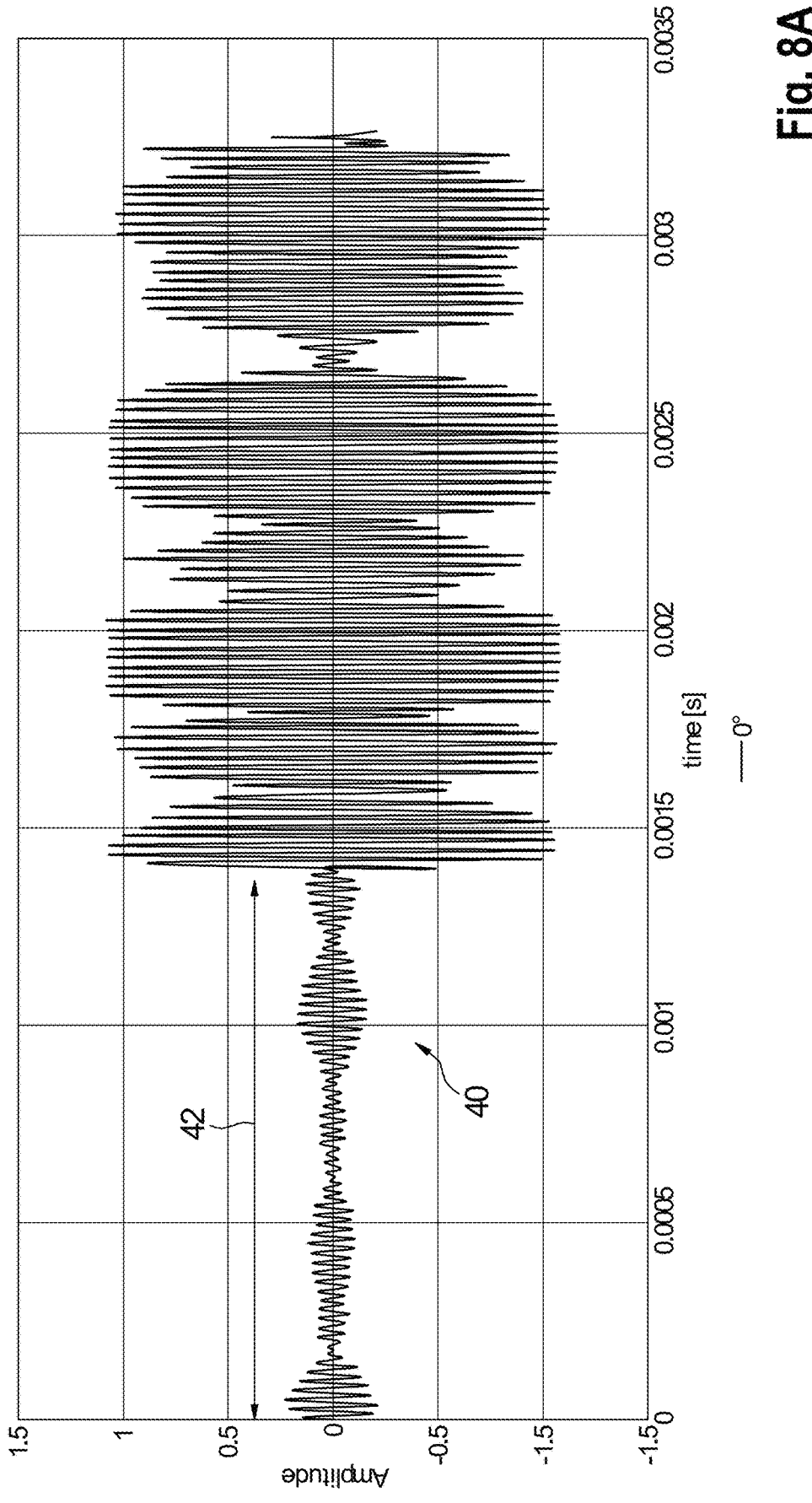
FIGS. 8A-E are schematic graphic illustrations of sonic signals received by the sonic receiver, illustrating signal variation under different operating conditions of a HVAC flow regulator.
Figure 8B:
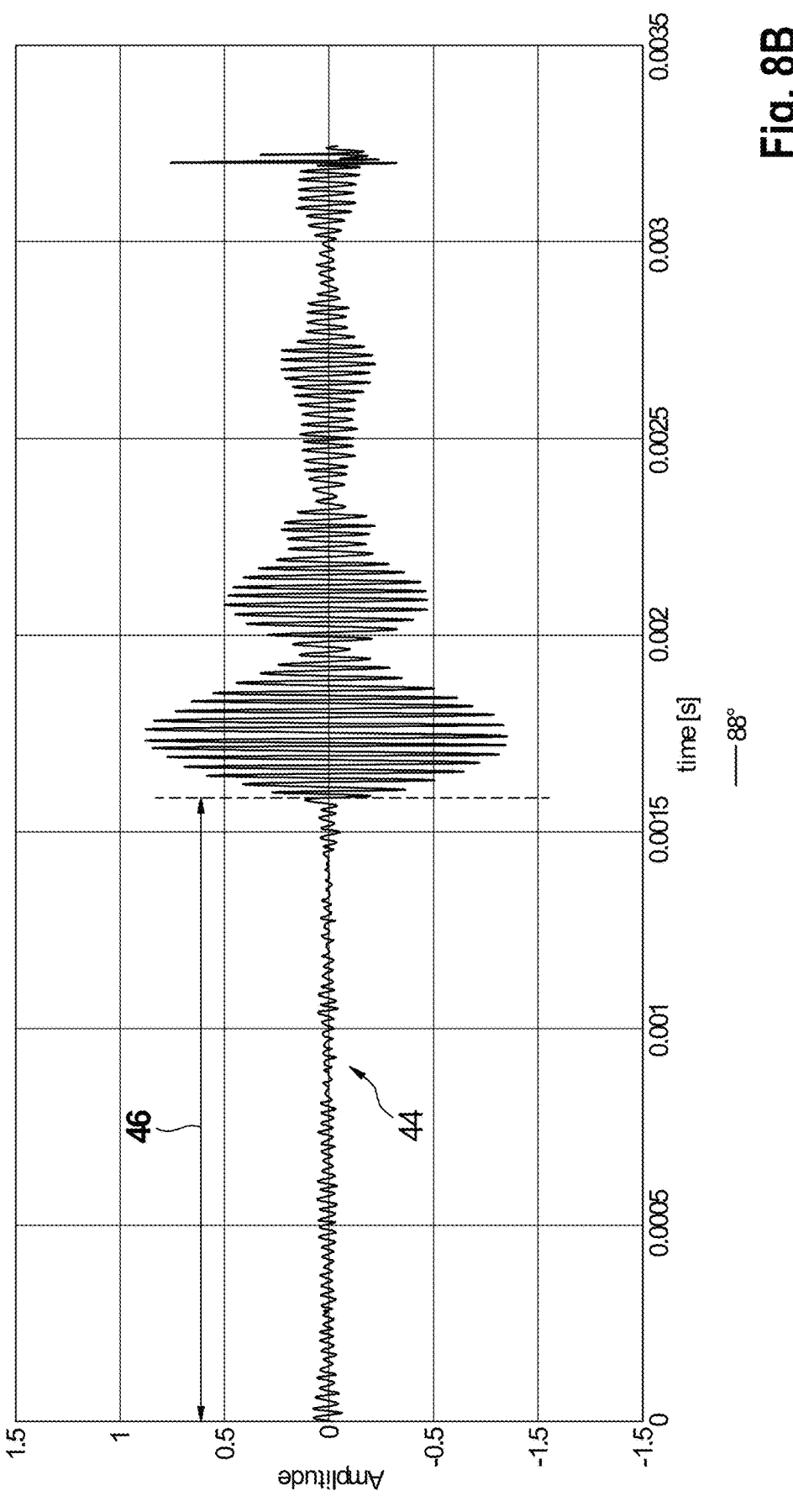
Figure 8C:
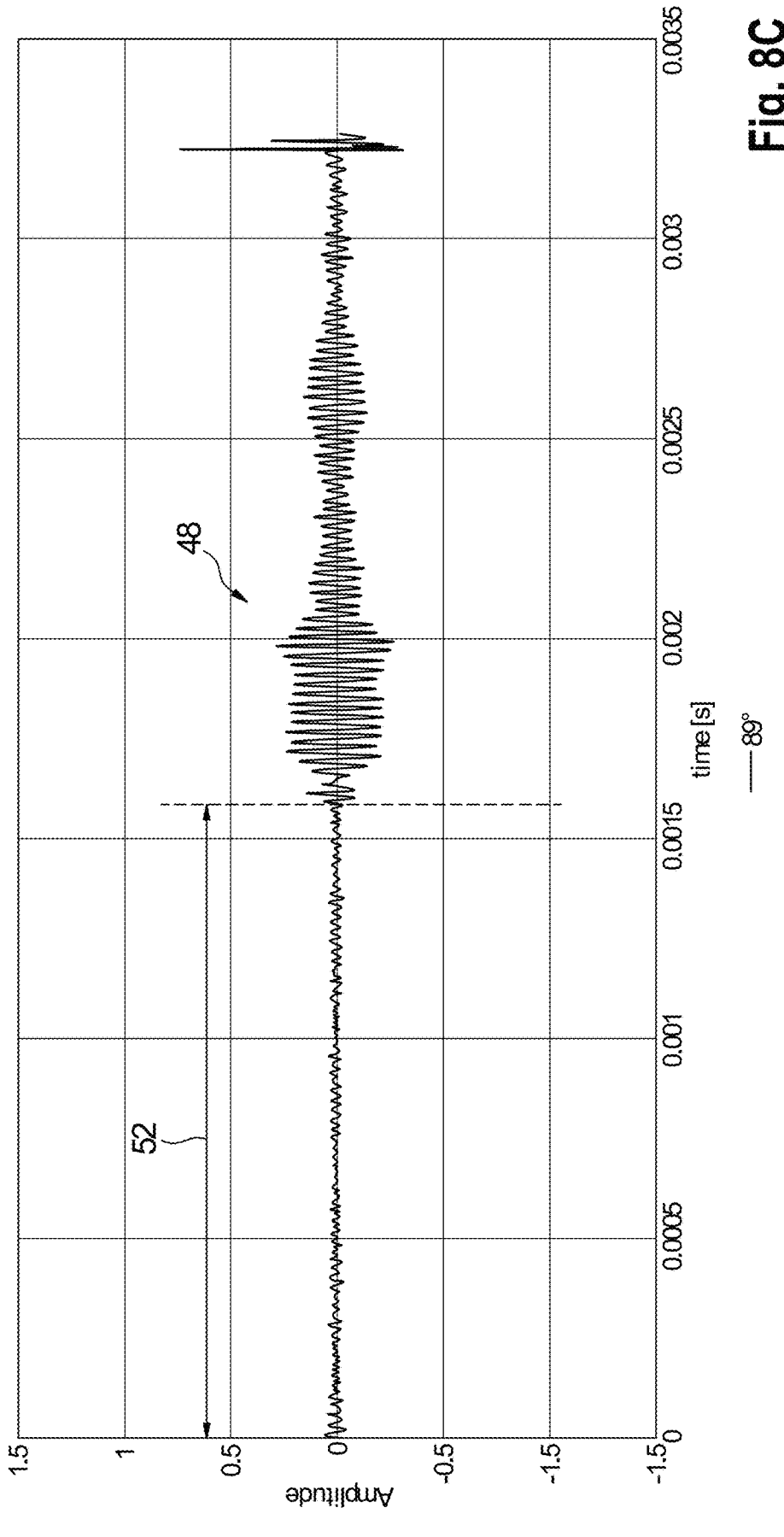
Figure 8D:
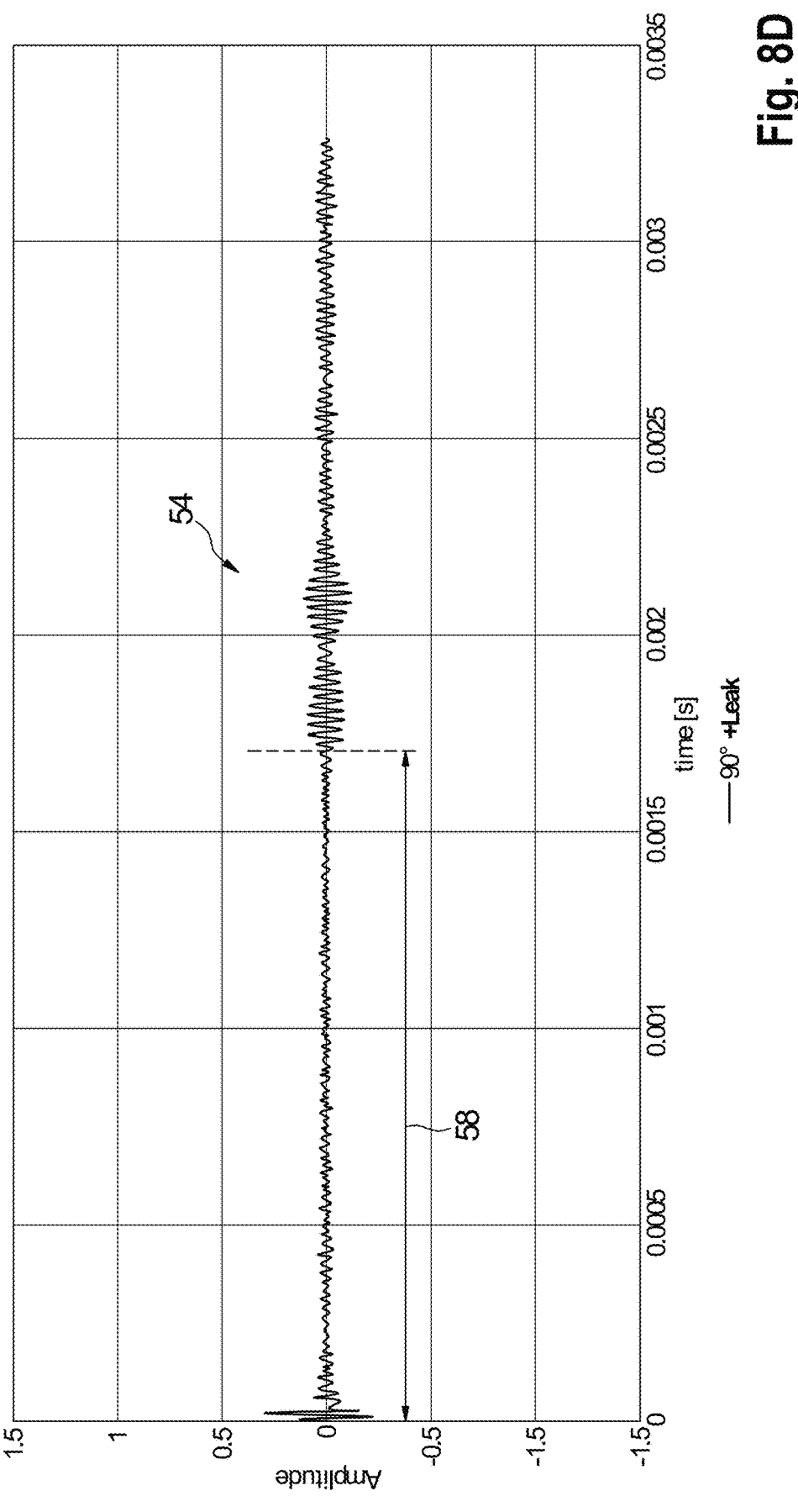
Figure 8E:
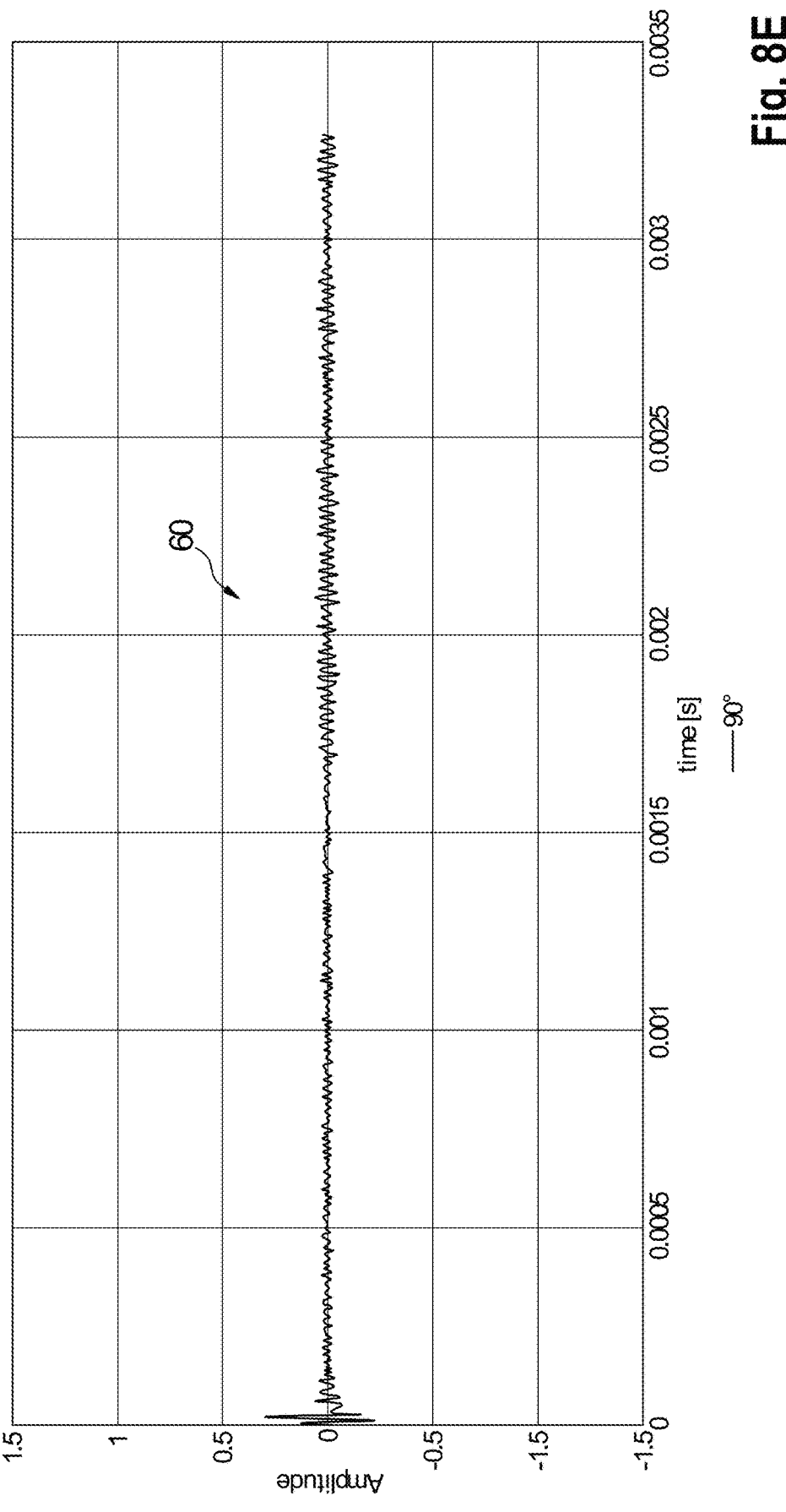
Figure 9:
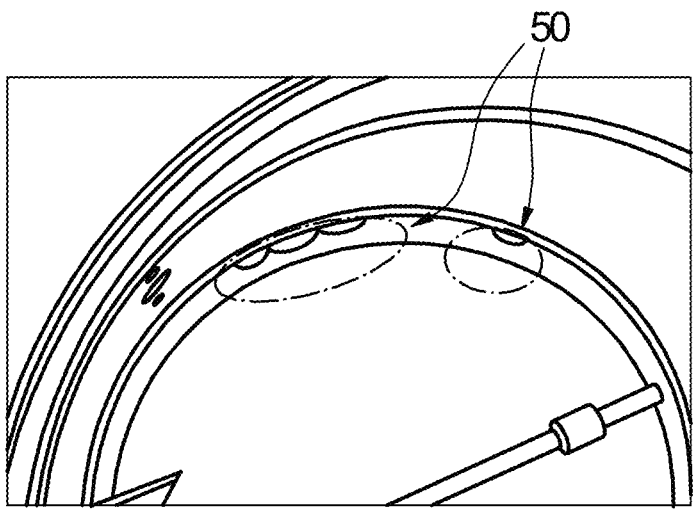
FIG. 9 is a schematic perspective view illustrating example gaps around a flow control member of a flow regulator in a nearly closed condition.
Figure 10:
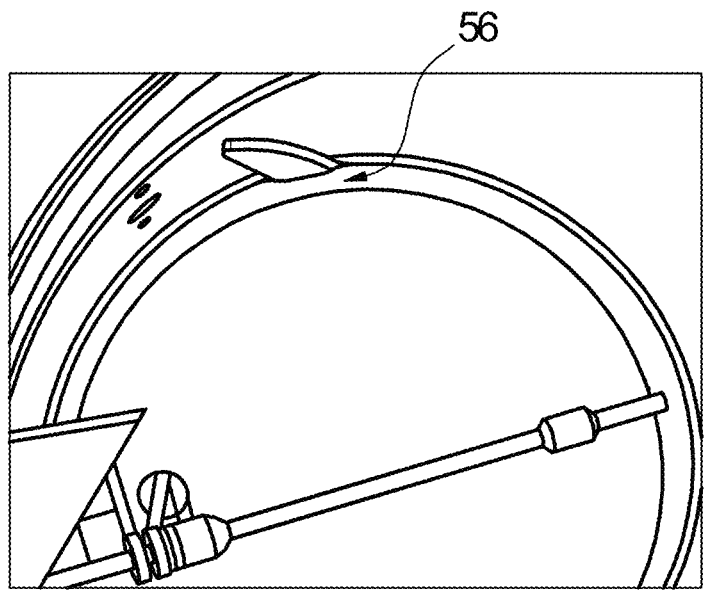
FIG. 10 is a schematic perspective view illustrating an example break in the seal around a flow control member of a flow regulator when in the closed condition.

FIGS. 8-10 illustrate an example of detecting one or more operating conditions related to the degree of fluid-tightness of the flow regulator, based on a sonic signal transiting the flow regulator 10 in the layout example of FIG. 1. The graphs of FIGS. 8A-E illustrate a received signal, over a short time duration, starting at "zero-time" when the sonic signal is transmitted into the flow channel. In this example, the sonic signal is an ultrasonic signal at a frequency of 40 KHz. The transmitted sonic signal is non-modulated (e.g. a continuous signal of constant amplitude).

Referring to FIG. 8A, trace 40 represents the signal received by the sonic receiver when the flow regulator is open (a flap position or orientation of 0° measured with respect to a plane parallel to the pivot axis of the flap, and parallel to the flow channel axis). The time of flight T-0°, or time delay from transmitter to receiver, is indicated at 42. The received signal has a large amplitude, because the flow regulator is at maximum aperture or maximum orifice, enabling most of the energy of the transmitted sonic signal to transit to the sonic receiver.

Referring to FIG. 8B, trace 44 represents the signal received by the sonic receiver when the flow regulator is pivoted through 88°, ie. pivoted towards its closed position (at 90°), but with some gap remaining around at least a majority of the flap. It can be seen that the amplitude remains relatively strong. The time of flight T-88°, represented at 46, is noticeably longer than the fully-open position, because the gap remains only towards the periphery of the flow channel. The sonic signal has to travel along a longer path length than in the fully-open position when the path-length is shortest and the path most direct.

Referring to FIG. 8C, trace 48 represents the signal received by the sonic receiver when the flow regulator is pivoted at 89°, namely, slightly closer to the fully closed position of 90°. Referring to FIG. 9, at the 89° position, fewer and smaller gaps 50 remain around the periphery of the flow regulator, and these gaps 50 are at the extremity of the flow channel. The amplitude of the received signal is reduced because the smaller gaps result in less sonic energy transiting the flow regulator. Also, the time of flight T-89° represented at 52 is again noticeably longer, because the gaps are now at the extreme edge of the flow channel.

Referring to FIG. 8D, trace 54 represents the signal received by the sonic receiver when the flow regulator is pivoted fully closed at 90°, but with a break 56 in the seal creating a small leak path (FIG. 10). Even though the leak path is small, the trace 54 is still easily detectable. Use of an ultrasonic signal enables the technique to be very sensitive to any leak path. The time of flight T-90°+Leak, indicated at 58, is similar to T-89°, because the leak path exists at the extreme edge of the flow channel.

Referring to FIG. 8E, trace 60 represents the signal received by the sonic receiver when the flow regulator is pivoted fully closed at 90°, creating a perfect fluid-tight seal without leakage. The signal amplitude is very small, almost negligible, because substantially no sonic energy transits the flow regulator.

Therefore, by analysing amplitude and/or TOF information, for example, analysing how the amplitude and/or TOF change as the flow regulator cycles from open-to-closed (or closed-to-open) during a test cycle or during normal operation, the operating condition of the flow regulator can be detected and/or monitored.

Figure 11:
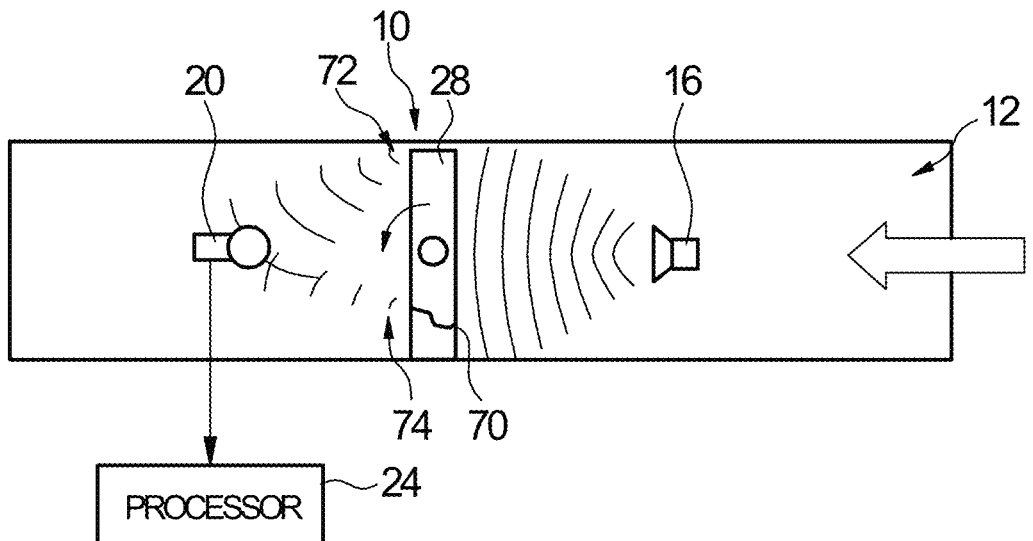
FIG. 11 is a schematic block diagram illustrating how time of flight information is useful for distinguishing between different types of leak path at a controllable flow regulator.

FIG. 11 illustrates a further comparison in which a small crack or other defect 70 exists in the flow control member 28 of flow regulator 10. FIG. 11 compares the path lengths between a small peripheral leak 72, and an inboard leak 74 through the small crack 70 inboard of the peripheral edge. As discussed with respect to FIGS. 8A-E, use of an ultrasonic signal makes the system sensitive even to small leak paths allowing ultrasonic energy to transit from one side of the flow regulator to the other. A difference between a peripheral leak 72, and an inboard leak 74 is that the inboard leak provides a more direct signal path than the peripheral leak. The time of flight is thus smaller for the inboard leak 74 than the peripheral leak 72. The signal amplitudes may be similar (if the leaks are of similar size), but the time of flight information enables the relative position of the leak optionally to be determined as part of the operating condition determined by the signal processor 24.

Figure 12:
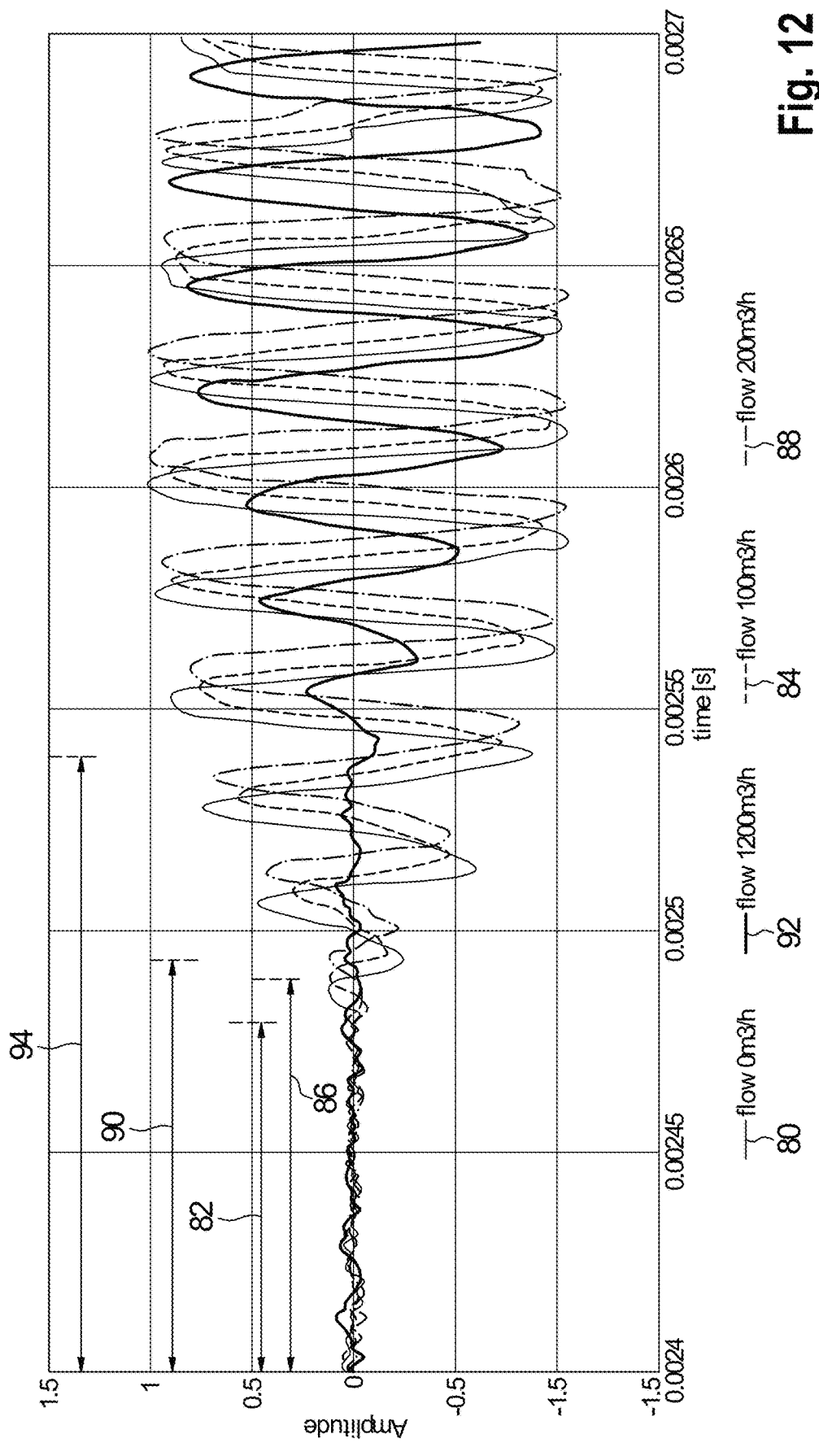
FIG. 12 is a schematic graphical illustration of sonic signals received by the sonic receiver, illustrating signal variation with volume flow rate through the controllable flow regulator.

FIG. 12 illustrates how time of flight information is useful even when the flow regulator 10 is in its open or fully open condition, enabling the signal processor 24 to calculate fluid flow rate through the flow regulator as an operating condition without requiring the a dedicated flow rate sensor. In this example, the sonic signal is an ultrasonic signal at a frequency of 40 KHz, and a single signal burst is illustrated.

Trace 80 represents the signal received by the sonic receiver with the flow regulator open, but with no fluid flow. The time of flight T-0 is represented at 82. Trace 84 represents the signal for fluid flow of 100 m³/hr. The corresponding time of flight T-100 is represented at 86. Trace 88 represents the signal for fluid flow of 200 m³/hr. The corresponding time of flight T-200 is represented at 90. Trace 92 represents the signal for fluid flow of 1200 m³/hr. The corresponding time of flight T-1200 is represented at 94. The time of flight varies with volume flow rate of the fluid. In particular, the time of flight increases with increased volume flow rate, enabling the flow rate to be determined (either by calculation or by empirical evaluation using known TOF information for known flow rates).

As mentioned above, both transmitters 16 and receivers 20 may be disposed on both sides of a flow regulator 10, and operated bidirectionally, in such a manner that one transmitter and receiver pair effects detection in a first transmission direction across the flow regulator, and the other transmitter and receiver pair effects detection in an opposite second direction across the flow regulator. Two independent flow rate calculations can be performed, one being a forward direction of flow with respect to the sonic signal, and the other being a negative direction of flow with respect to the sonic signal. The two flow rate calculations can be combined to enhance an aggregate flow rate calculation.

The signal processor 24 may use the time of flight information selectively, depending on plural factors. For example, several factors may influence time of flight, including whether the flow regulator is open, closed, or partially open. As illustrated above in FIGS. 8A-E, when the flow regulator moves towards its closed condition, the flow control member of the flow regulator influences the path length for the sonic signal, thereby increasing time of flight even though volume flow decreases as the flow regulator closes. The signal processor 24 may be configured to use time of flight selectively: (i) as part of leak-detection when the flow regulator is nearer closed than a predetermined position threshold, or (ii) as part of volume flow rate calculation when the flow regulator is nearer open than the predetermined position threshold.

A further factor affecting time of flight information is the temperature of the fluid, because the velocity of a sonic signal in a fluid is dependent on fluid temperature. Where the temperature of the fluid in the flow channel 12 does not vary significantly in use, the temperature may be presumed to be fixed to simplify the calculation of volume flow rate. Where the temperature may vary in use, a temperature sensor (not shown) may be provided to input additional temperature information to the signal processor 24. Similarly, if the flow rate is itself known (e.g. if a dedicated flow rate sensor is provided), then the time of flight information may still be useful to deduce the temperature of the fluid, even when no dedicated temperature sensor is provided.

Figure 13:
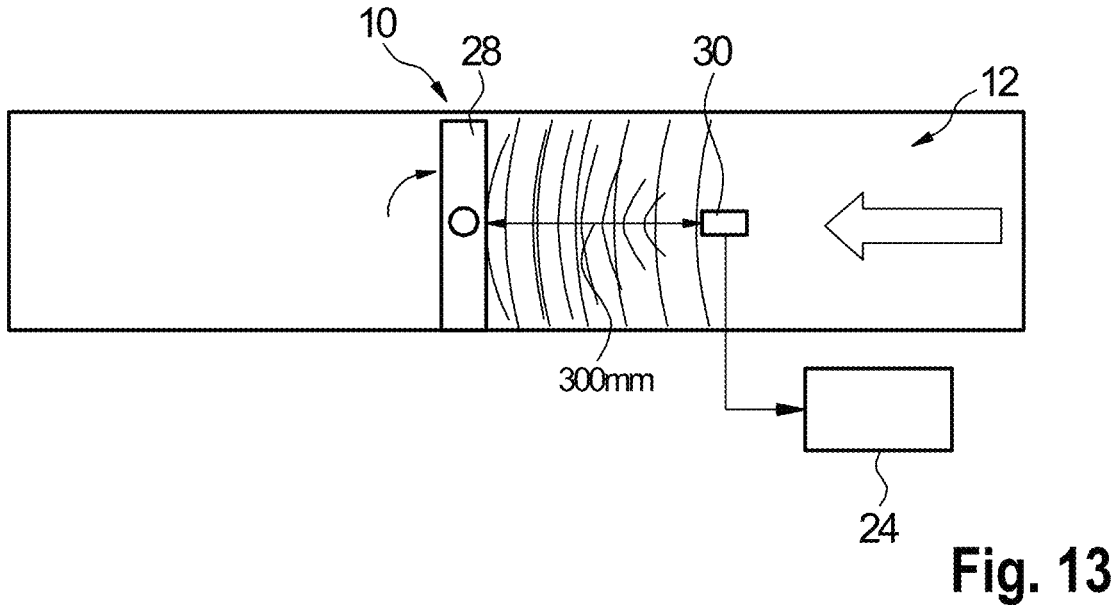
FIG. 13 is a schematic block diagram similar to FIG. 2 illustrating a flow regulator in a first operating condition, and showing use of sonic signal reflection to determine the condition.
Figure 14:
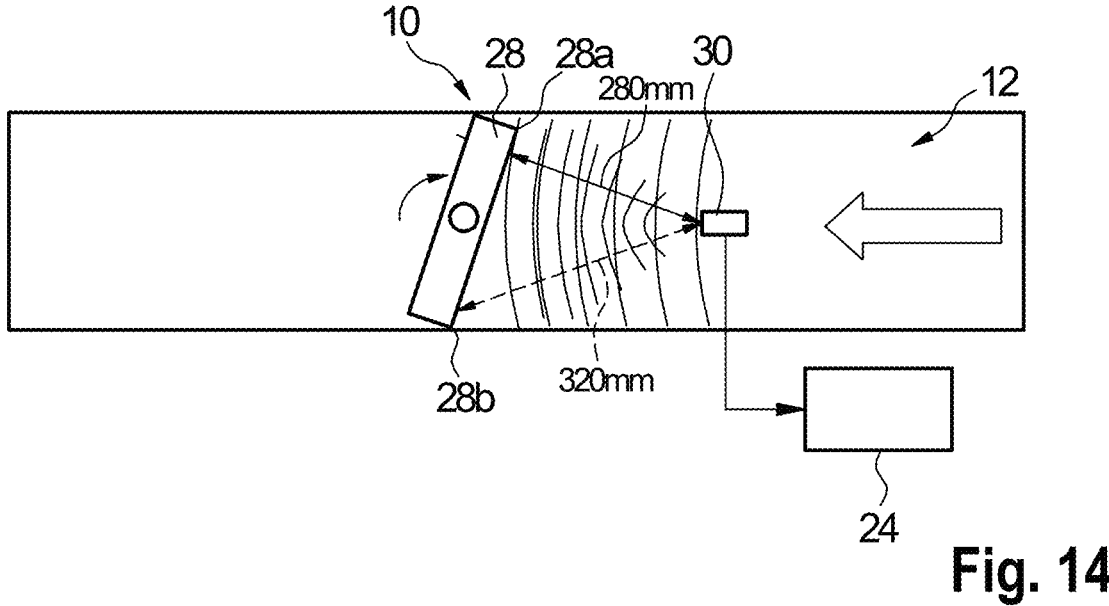
FIG. 14 is a schematic block diagram similar to FIG. 13 illustrating a flow regulator in a second operating condition, and showing use of sonic signal reflection to determine the second condition.

FIGS. 13 and 14 illustrate a component layout similar to FIG. 2 used to evaluate the operating position and condition of a flow control member 28 of a flow regulator 10. In FIG. 13, the flow control member 28 is illustrated in its closed position generally perpendicular to the flow channel 12, and a distance of about 300 mm from the sonic receiver 20. In FIG. 14, the flow control member 28 is illustrated in a partly open position in which the flow control member 28 is inclined, or oblique, with respect to the flow channel axis. One end 28a of the flow control member 28 approaches closer to the sonic receiver 30 (for example, a distance of about 280 mm), while the opposite end 28a moves further away (for example, a distance of about 320 mm). The reflection of the sonic signal to the sonic receiver varies with movement of the flow control member 28, giving a different distribution of amplitude and time-of-flight characteristics. Using such characteristics, the signal processor 24 can determine a number of different possible conditions, such as the detect whether the flow control member 28 is open or closed, and/or detect whether an additional part of object lies in front of the sonic receiver, and/or determine the degree of pollution in the flow channel, and/or estimate the angular position of the flow control member 28, and/or detect should a part of the flow control member break off or go missing.

Figure 15:
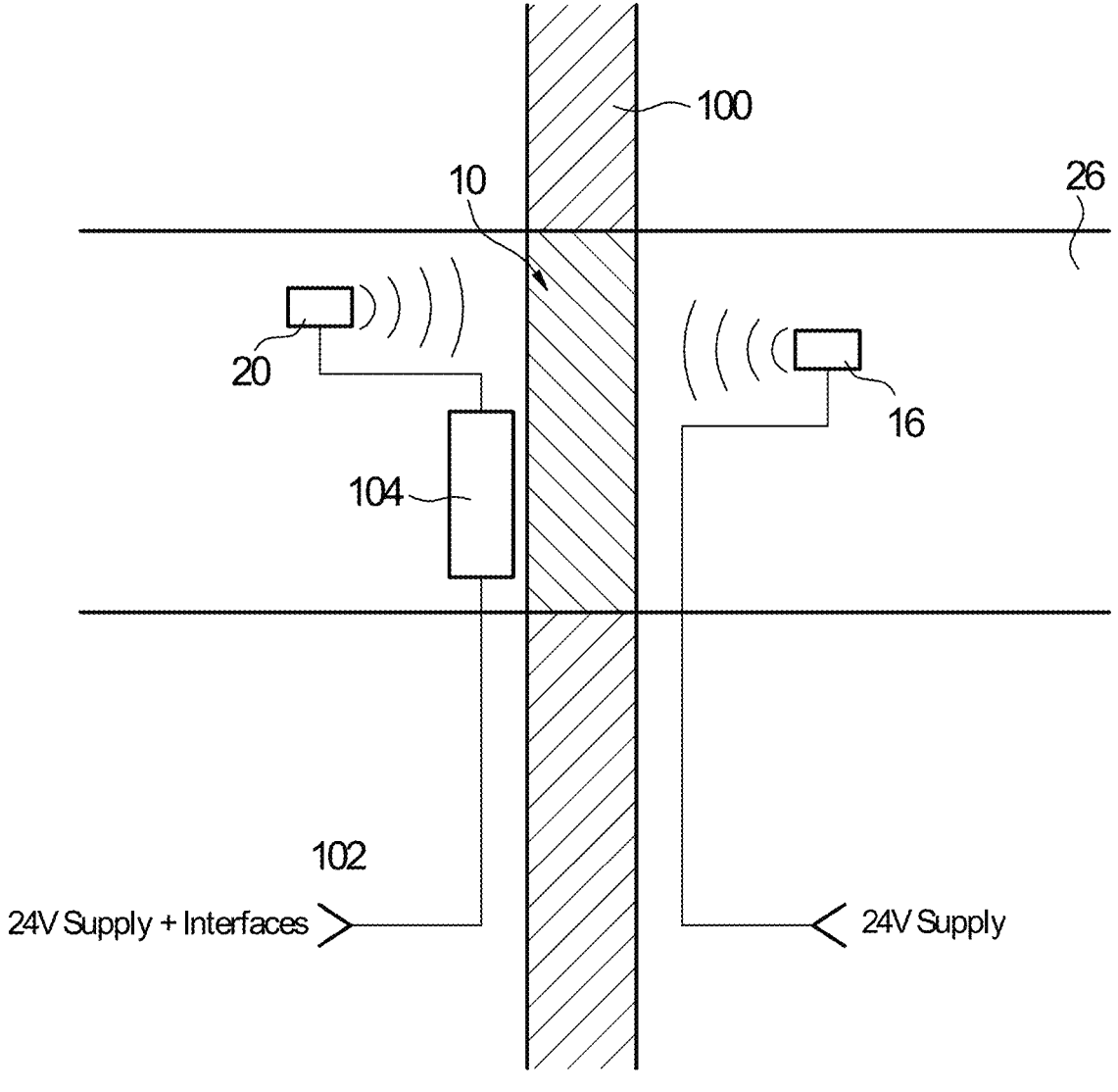
FIG. 15 is a schematic section showing an implementation of a sonic transmitter and sonic receiver for an HVAC fire damper mounted in a fire protection wall.

FIG. 15 shows an installation example illustrating certain advantages of being able to separate electrically the sonic transmitter 16 and the sonic receiver 20. FIG. 15 illustrates a flow control regulator 10 in the form of a fire damper installed in a conduit 26 traversing a fire-protection wall 100 of a building. The fire damper 10 is installed generally in register with the wall 100 such that, when the fire damper 10 is closed, it forms a barrier substantially in register with the fire protection wall 100. An electrical cable connection 102 on one side of the wall 100 (e.g. to the left in FIG. 15) provides power and control to the actuator 104 of the fire damper 10. The actuator is configured automatically to close the damper in the event of abnormal smoke or heat detected within the conduit 26, or in the event of loss of power via the cable 102, or in response to a control signal sent to the actuator from a system-wide controller (not shown).

The sonic transmitter 16 and sonic receiver 20 are positioned either in the flow channel 12 or mounted externally of the conduit 26, on opposite sides of the fire damper 10, in a similar manner to FIG. 1. In the illustrated form, the sonic receiver 20 is arranged on the same side as the actuator 104, optionally to enable the signal processing circuit to benefit from being included with or as part of the actuator circuitry. However, the positions of the sonic transmitter 16 and sonic receiver 20 could be swapped if desired.

In the illustrated example, there is no electric cabling connecting directly the sonic transmitter 16 and the sonic receiver 20. Each is powered independently by electrical connections staying on the respective side of the fire protection wall 100. This avoids any need to bore any further holes through the fire protection wall 100, and thereby preserves the integrity of the wall 100 as much as possible. Even though the receiver side circuitry is independent of the transmitter side circuitry, the two sides can establish synchronisation by deriving timing information from a modulation schema used in the signal transmitted by the sonic transmitter 16. For example, one such modulation schema may comprise a repeating coded sequence of signal bursts, for example, in sequence: a first signal burst of duration T, a first break of duration 2T, a second signal burst of duration 2T, a second break of duration 2T, followed by a repetition starting with a next burst of duration T. The duration T may, for example, be about 100 ms, or any other suitable unit value. Although a flow regulator 10 in the form of a fire damper is illustrated, similar principles may be used for a smoke damper.

Figure 16:
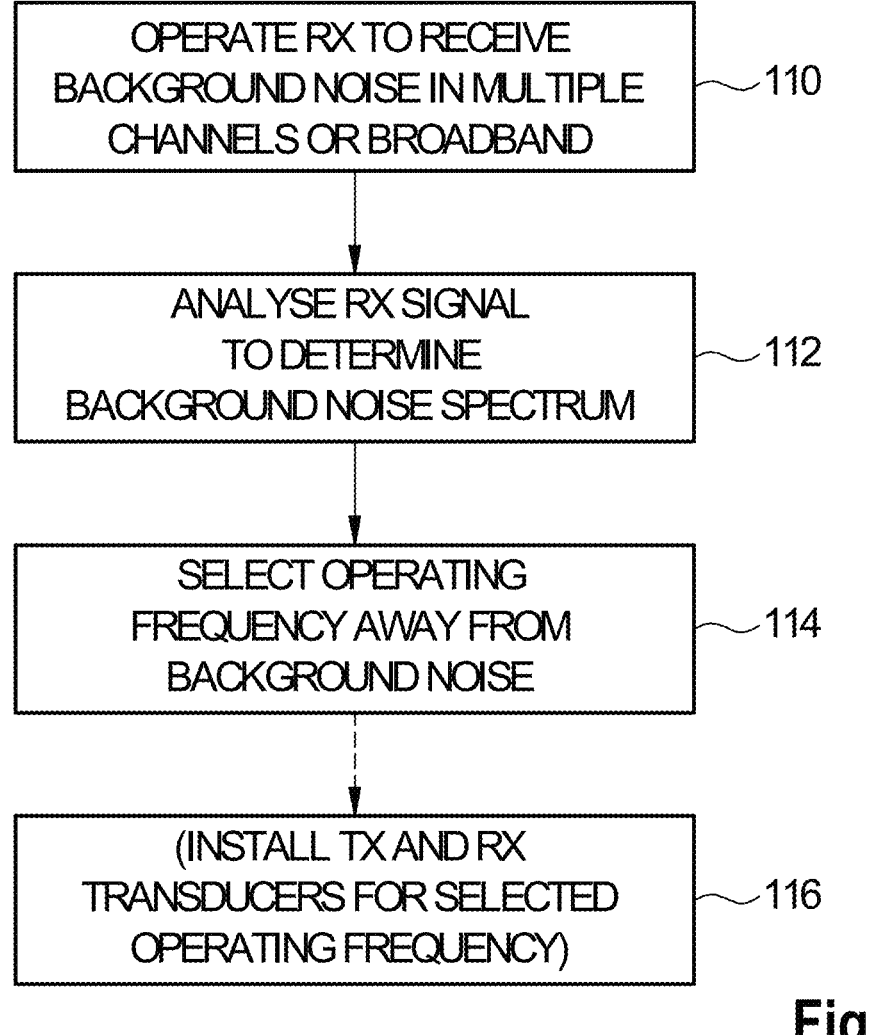
FIG. 16 is a schematic flow diagram illustrating method steps for selecting an operating frequency away from background noise.

FIG. 16 illustrates a methodology useable in some embodiments to select an operating frequency that is away from background noise. The method may be executed periodically to dynamically select and adapt the operating frequency as the background noise conditions vary. Alternatively, the method may be executed a single time during equipment installation, with the selected operating frequency remaining fixed thereafter (optionally until subsequent maintenance).

At step 110, a sonic receiver (e.g. the sonic receiver 20 if appropriate) is operated to receive background noise in multiple frequency channels or across a broadband spectrum. At step 112, the received signal is analysed to determine the spectrum of background noise. At step 114, selection of an operating frequency is made such that the operating frequency is in a region of the spectrum that is free, or at least relatively free, from background noise. If multiple candidate operating frequencies are found, selection may be based, for example, on the history of candidate availability and selection, and/or on the distance of the operating frequency away from significant background noise. If the sonic transmitter 16 and sonic receiver 20 are broadband units capable of operating in any selected operating frequency (at least within a certain range), the selected operating frequency may be implemented by suitable control of the transmitter and/or receiver. Alternatively, the method also envisages optional step 116 at which appropriate transducers for the sonic transmitter and sonic receiver are installed.

Figure 17:
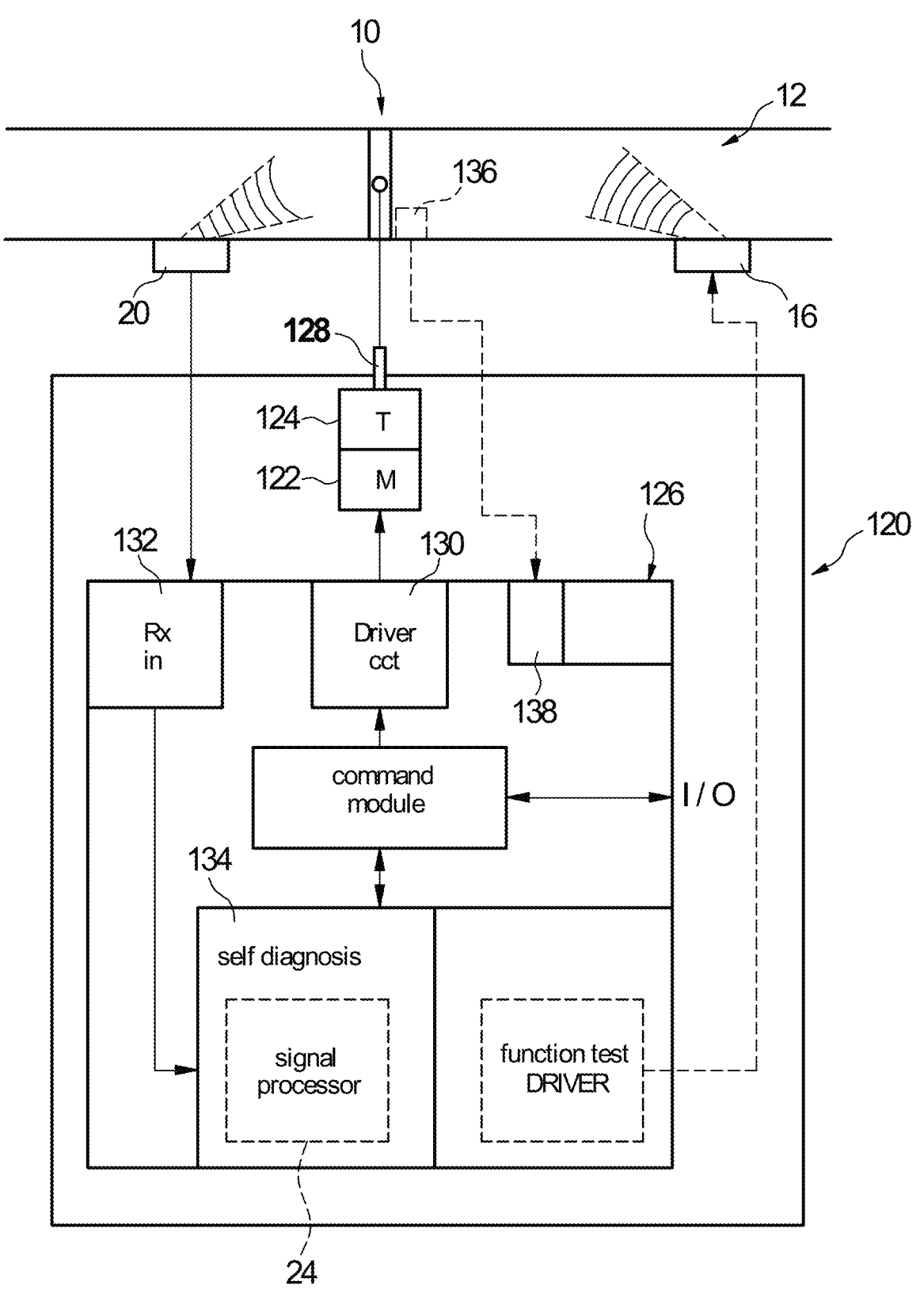
FIG. 17 is a schematic block diagram of a flow regulator and associated actuator.

FIG. 17 illustrates functional components of an HVAC flow regulator actuator 120 for actuating the flow regulator 10, and interfacing with the receiver 20, and optionally with the sonic transmitter 16 (unless the sonic transmitter 16 is electrically separate from the receiver). The actuator 120 comprises an electro-mechanical driver, such as an electric motor for driving movement of an actuator member 128, for actuating the flow regulator 10. A mechanical transmission 124 mechanically connects the motor 122 to the actuator member 128. The actuator 120 further comprises electronic controller circuitry 126 having an output 130 coupled to the motor 122 for commanding operation of the motor. The controller circuitry 126 further comprises at least one input 132 for receiving a signal from a sonic receiver 20, optionally from plural sonic receivers 20. The controller circuitry 126 further includes the signal processor 24 as an integral part of the actuator 120, for detecting an operating condition of the flow regulator, as part of normal operation of the regulator, or as part of a dedicated self-diagnosis function 134 configured for detecting actual or forthcoming malfunction of the flow regulator 10 and/or of the actuator 120.

In some embodiments, the flow regulator 10 includes a hard-stop, including a sensor switch 136, that pre-defines the closed position of the flow regulator 10 and detects when the flow regulator reaches the pre-defined closed position. The controller circuitry 126 may include an input for such a sensor signal 138. However, since the signal processor 24 is able to detect accurately when the flow regulator is functionally fluid-tight, without leaks, it also envisaged that a flow regulator 10 without a hard stop, and/or without a pre-defined closed position, and/or without a physical sensor switch 136 may be used instead. The control circuitry 126 may command movement of the flow-regulator 10 until a functionally closed condition is reached.

Additionally or alternatively, the self-diagnosis model 134 of the controller circuitry may be configured to monitor the closed position, and to generate a warning indication should variation in the closed position exceed a tolerance, and/or should leakage exceed an acceptable threshold. This may, for example, be indicative of distortion or shape set of a seal seat or seal liner used in the flow regulator 10.

Figure 18:
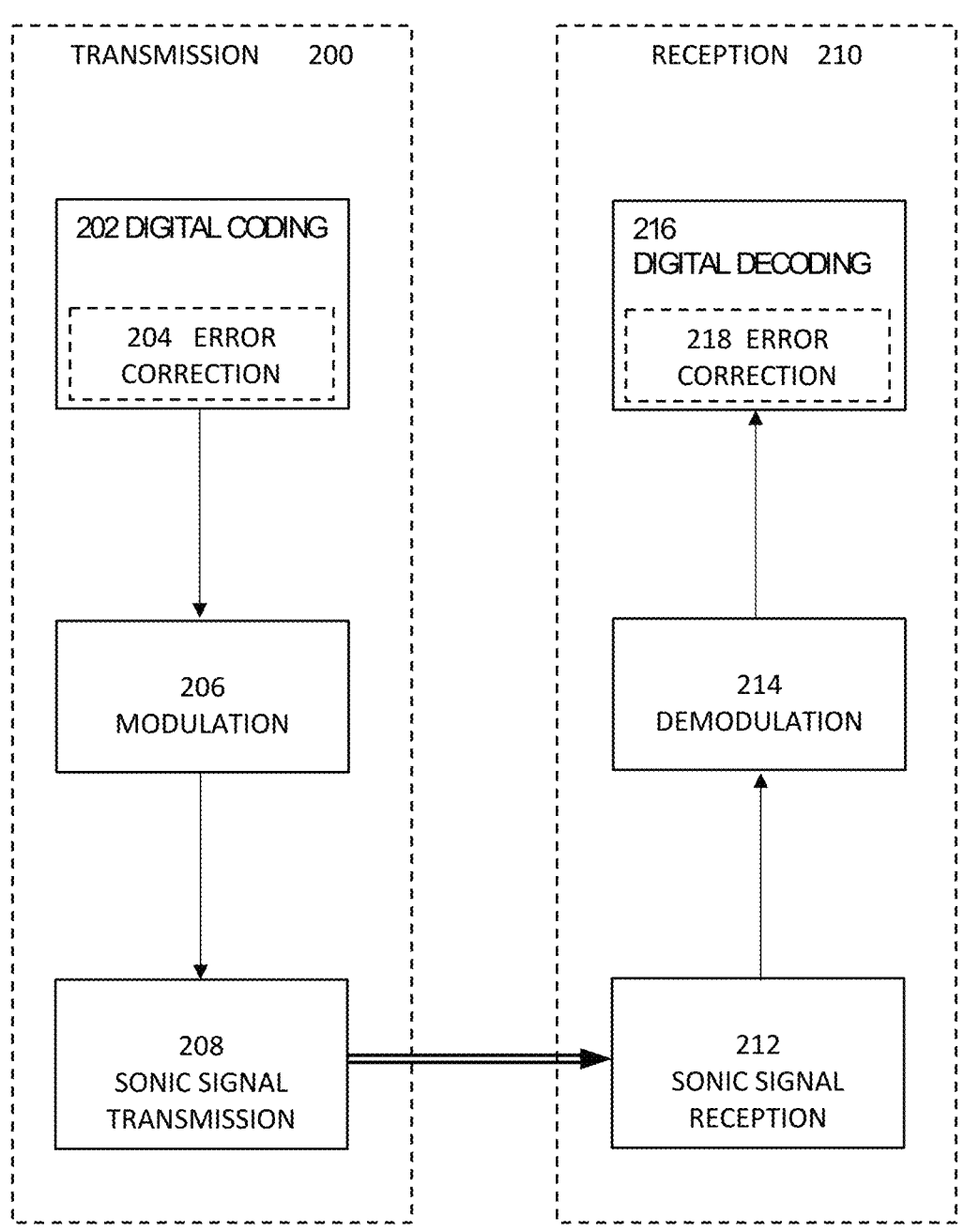
FIG. 18 is a schematic block diagram of signal processing including digital coding and decoding for the sonic signal.

FIGS. 18 to 20 illustrate a further example of use of a modulated sonic signal, which may be a modulated ultrasonic signal. A feature of this example is that the signal is modulated to carry a digitally coded signal.

The digitally coded signal may, in some embodiments, comprise (at least part of the time) a fixed code. The fixed code may represent invariable data, for example, a code-bit or a code-word. Additionally or alternatively, the coded signal may, in some embodiments, comprise (at least part of the time) a variable code. The variable code may be used to transmit variable information. As illustrated later below, the digitally coded signal may, in a first e.g. "communications" cycle of operation, be a variable and/or communications message for transmitting operative information from one side of the flow regulator to another. The digitally coded signal may, in a second e.g. "measurement" cycle of operation, be a fixed and/or measurement signal for measuring an operating characteristic of the flow regulator.

Digital coding of the modulated signal adds an extra layer of information content to the sonic signal, which can aid discrimination of the sonic signal at the receiver side, even when the signal-to-noise ratio is poor, for example, less than zero. The digital coding can use redundancy and/or error correction in order to enable discrimination and/or recovery of signal content that would otherwise be lost.

As well as cases of severe background noise, a poor signal-to-noise ratio may occur in many other situations. For example, in the case of a flow duct having a relatively large cross-section area, for example, a lateral dimension greater than about 250 mm or about 300 mm, it is challenging for a single, low-cost transducer to have sufficient beam width to transmit the sonic signal across the entire width or height of the duct, and/or to receive the sonic signal from the entire width and/or height. The signal footprint can be increased by increasing the distance between the flow regulator and the transducer, but attenuation of the sonic signal (especially an ultrasonic signal in air) reduces the signal strength, and reduces signal-to-noise ratio. Further, in case of a fire damper, the a major limitation is that the transducer has to be within the fire damper, which typically has a fixed length. A further factor when seeking to detect small leak paths is that a small leak path only allows passage of a small amount of the sonic signal energy. The strength of the received signal can be extremely small, reducing the signal-to-noise ratio. Efficient and reliable detection of a small leak in a flow regulator for a large duct size, using single economic ultrasonic transducers, adds technical challenges to distinguishing the sonic signal from background noise.

FIG. 18 illustrates a combination of digital coding and modulation as described above. Signal processing for the transmission side 200 includes a digital coding step 202 to generate a signal as a digital code. The coding step may optionally comprise the step of including redundancy and/or error correction 204, to enhance the transmission resilience of the signal. The method further includes a modulation step 206 to generate a modulated signal suitable for driving a transducer to transmit a sonic signal (e.g. an ultrasonic signal) at transmission step 208.

One example of signal modulation is phase keying (also referred to as a phase shift keying), in which the phase of a carrier signal is switched between discrete phases (e.g. two discrete phases with a 180° phase shift) to represent digital signal values for transmission. FIG. 19 illustrates binary phase-shift keying from an ultrasonic transducer, for example, a transducer driven at its natural frequency of 40 kHz, compared to a reference sinus signal 232 of the same frequency. In FIG. 19, it can be seen that the transmitted signal of the ultrasonic transducer 230 is shifting its phase by 180 degrees within relatively few pulses, for example, less than 10 pulses, of the carrier wave, thus illustrating phase keying as a viable modulation scheme for relatively low cost transducers.

Returning to FIG. 18, signal processing for the receiving side 210 includes a sonic signal receiving step 212 and demodulation step 214. The demodulated signal is passed to signal decoding step 216, which optionally applies error correction processing 218 depending on the redundancy and/or error correction used on the transmission side. Decoding and demodulation may also be linked, e.g. both steps may be iteratively repeated, or may be combined into one.

The output from the decoding step 216 may be either the decoded signal itself, and/or a signal indicative of whether a signal has been successfully received and decoded. For example, in the case of leak detection, the presence of a successfully received and decoded signal may be indicative of a leak at the flow regulator.

FIG. 20 illustrates a technique that may be used, for example, in the embodiment of FIG. 15, in which the transducers on opposite sides of the flow regulator are electrically separated from each other. By employing the digital coding/decoding of FIG. 18, the transducers can be used to communicate operative information from one side of the flow regulator to the other. Referring to FIG. 20, the technique may include a communication cycle (or phase) of operation 220, and a measurement cycle (or phase) of operation 222. The communication cycle 220 may be used when the flow regulator is open (e.g. has been set to open). The measurement cycle 222 may be used when the flow regulator is closed (e.g. has been set to closed), for example, for testing the integrity of the seal of the flow regulator in its closed state. The transducers may be sonic transceivers, including both transmission and reception capability, for bidirectional operation.

In one example, the communication cycle 220 is used for one transducer (for example, on the actuator side of the flow regulator) to command the other transducer to start a measurement cycle of operation. During the measurement cycle, the commanded transducer may emit a signal for testing the seal integrity of the flow regulator. The first transducer may operate in a reception mode for receiving the transmitted signal, to determine whether a leak path exists. The second transducer may be configured autonomously to transmit the signal for a predetermined period of time, for example, at least or about 10 seconds, optionally at least or about 20 seconds, optionally at least or about 30 seconds, optionally at least or about 40 seconds, optionally at least or about 50 seconds, or optionally at least or about at least 60 seconds. The predetermined period of time may be sufficient to allow the flow regulator to close under normal circumstances, and/or provide a reliable measurement duration. The second transducer may be configured to autonomously stop transmission of the signal after the predetermined period of time.

It is also envisaged that the functionality of the transducers may be reversed, such that the first transducer emits a sonic signal during the measurement cycle, and the second transducer operates in a reception mode to detect whether the sonic signal passes through the flow regulator.

Figure 21:
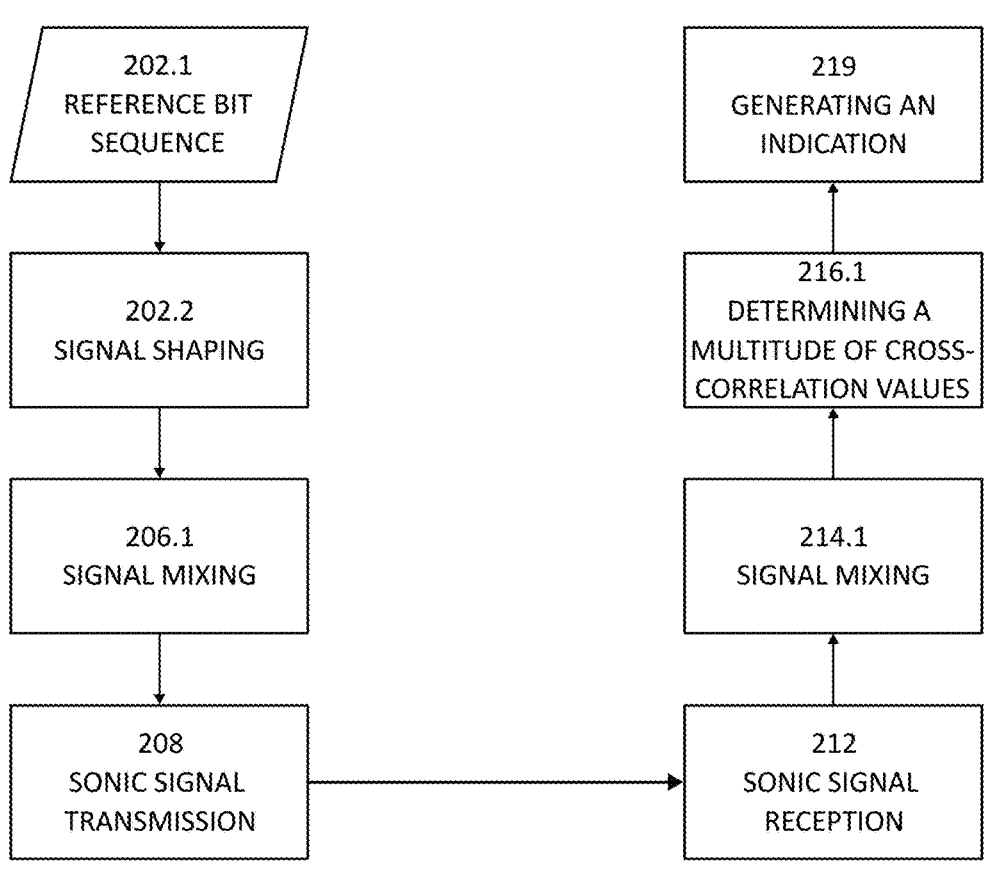
FIG. 21 is a schematic flow diagram of signal processing including integrating a reference bit sequence in the sonic signal for malfunction detection.

FIG. 21 illustrates yet another embodiment of the process about the digital coding 202 and digital decoding 216. In that particular embodiment, a reference bit sequence 202.1 is first pre-processed in a signal shaping 202.2 step using a root-raised cosine filter. The reference bit sequence 202.1 in that particular case is a Barker 13 sequence (bit sequence: 0 0 0 0 0 1 1 0 0 1 0 1 0), which has low autocorrelation at non-zero shifts.

The shaped signal is added to the natural frequency of the local oscillator in a signal mixing step 206.1. As in the above embodiments, the sonic signal transmission 208 step sends the sonic signal through the flow regulator 10.

In a sonic signal reception 212 step, the sonic signal is received and the natural frequency of the local oscillator is removed from the signal in another signal mixing 214.1 step. The further signal processing comprises the step of determining a multitude of cross-correlation values 216.1 between the reference bit sequence 202.1 and the sonic signal received. Basically, the cross-correlation values at integer shifts ranging from −12 to 12 are determined. The maximum cross-correlation value is compared to a pre-defined cross-correlation value threshold. This threshold has been determined based on cross-correlation data obtained using a functioning flow regulator. If the maximum cross-correlation value exceeds the threshold, a warning is produced by generating an indication 219 of at least one of a current and a forthcoming malfunction.

Figure 22:
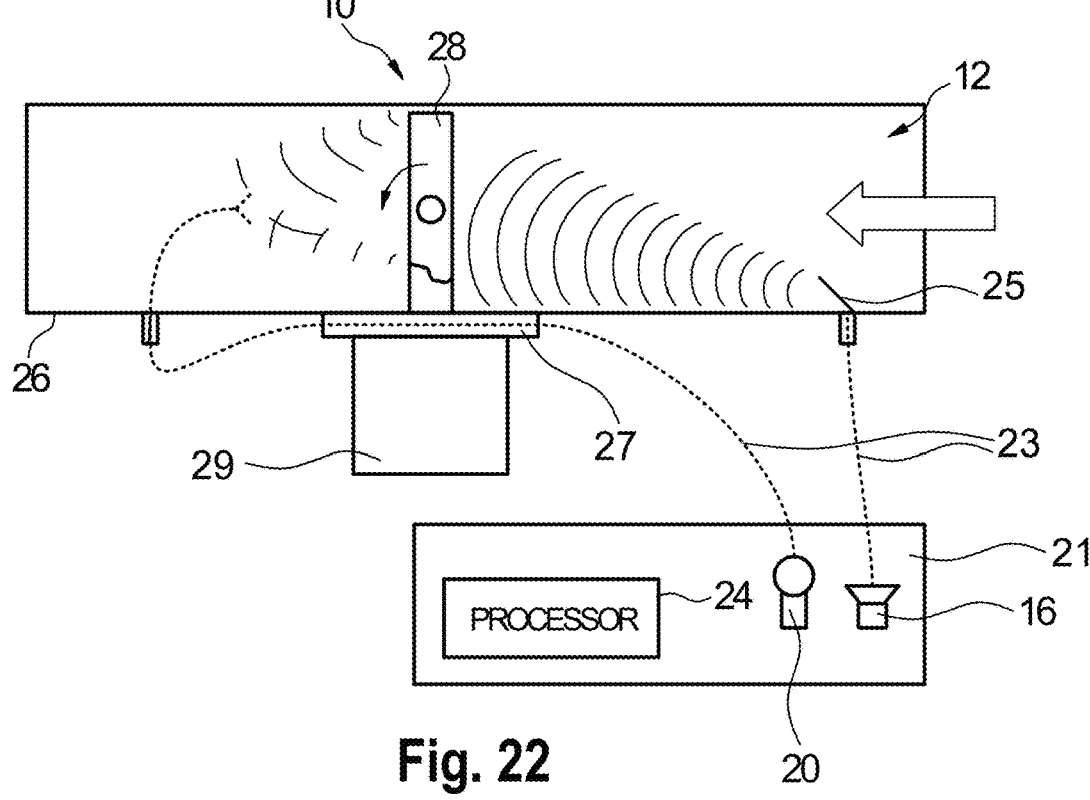
FIG. 22 is a schematic block diagram illustrating an example layout of components for determining an operating condition of a flow regulator of an HVAC system with the sonic transmitter and sonic receiver being positioned in the actuator housing and connected to the flow channel with air hoses.

In FIG. 22, the sonic transmitter 16 and the sonic receiver 20 are positioned inside an actuator housing 21. The sonic signal is transmitted from the sonic transmitter 16 via an air hose 23 with a sound reflector 25, which is fitted inside the flow channel 12. The sound reflector 25 directs the sound signal to the flow regulator 10.

The transmitted signal is then picked up again by another air hose 23 and routed to the sonic receiver 20. As the additional air hose 23 has to be routed through a wall 29, the air hose 23 is embedded in a thin metal tube 27.

In a particular advantageous embodiment the sonic transmitter 16 and the sonic receiver 20 are realized by means of a single sonic transceiver, including both transmission and reception capability, for bidirectional operation.

It will be appreciated that the foregoing description is merely illustrative of preferred embodiments of the invention, and that many modifications and equivalents may be used within the scope and/or principles of the disclosure.

The invention claimed is:

1. A method of detecting an operating condition of a controllable flow regulator in a fluid flow channel of an HVAC system, the method comprising the steps of:
   (a) transmitting a sonic signal, from a sonic transmitter, directly or indirectly to the flow regulator, the sonic signal being distinguished from background noise by being at least one of: (i) modulated according to a modulation schema, (ii) an ultrasonic signal, (iii) a frequency selected to be away from background noise;
   (b) receiving a signal from a sonic receiver for detecting the transmitted signal after interacting with the flow regulator; and
   (c) determining, in an electronic signal processor, the operating condition of the flow regulator on the basis of at least the signal received in the receiving step (b);

wherein the operating condition is or comprises one or more of:

(i) a degree of fluid-tightness of the flow regulator when in a closed condition;

(ii) the presence or absence of a leakage path through the flow regulator when in a closed condition;

(iii) at least one of a closure state and a closed position of the flow regulator;

(iv) detection that the flow regulator is in a closed state;

(v) a physical position of a movable flow control member of the flow regulator;

(vi) evolution over time of the physical position of a movable flow control member when cycled to the closed condition;

(vii) evolution over time of leak paths through the flow regulator when cycled to the closed condition;

(vii) an indication of where around a perimeter of a flow control member a leakage path is detected to exist, based on a time interval between emitting of the signal into the flow channel, and reception of the signal from the flow channel;

(vi) at least one of an amount of hysteresis in the flow regulator and an actuator of the flow regulator;

(vii) at least one of distortion and wear of a seal component of the flow regulator;

(viii) indication of at least one of a current and a forthcoming malfunction of at least one of the flow regulator and an actuator of the flow regulator;

(ix) the degree of intactness of a flow control member of the flow regulator;

(x) indication of foreign matter in the flow channel in the vicinity of the flow regulator selected from the group consisting of accumulation of deposits, contamination of the fluid, and pollution of the fluid;

(xi) a physical position of a movable vane of the flow regulator;

(xii) at least one of distortion and wear of at least one seal component of the flow regulator selected from the group consisting of a seal member a seal seat, and a seal liner.

2. The method according to claim 1, wherein transmitting comprises directly transmitting the sonic signal to the flow regulator by a sonic transmitter coupled to a flow control member of the flow regulator.

3. The method according to claim 1, wherein receiving comprises receiving a signal from at least one sonic receiver coupled to the flow control member of the flow regulator.

4. The method according to claim 1, wherein transmitting comprises indirectly transmitting the sonic signal to the flow regulator by a sonic transmitter transmitting the sonic signal into the flow channel on a first side of the flow regulator.

5. The method according to claim 1, wherein receiving comprises receiving a signal from a sonic receiver for detecting the sonic signal from the flow channel.

6. The method according to claim 5, wherein receiving comprises receiving a signal from a sonic receiver for detecting the sonic signal from the flow channel on an opposite second side of the flow regulator, and the step of determining comprises processing the received signal as a component of the transmitted signal transiting the flow regulator.

7. The method according to claim 5, wherein the step (b) of receiving comprises receiving a signal from a sonic receiver for detecting the sonic signal from the flow channel on the first side of the flow regulator, and the step of determining comprises or further comprises processing the received signal as a component of the transmitted signal reflected by the flow regulator.

8. The method according to claim 1, further comprising commanding an actuator of the flow regulator responsive at least partly to the operating parameter.

9. The method according to claim 1, further comprising generating an indication of at least one of a current and a forthcoming malfunction responsive at least partly to the operating condition.

10. The method according to claim 1, wherein at least one of step (a) of transmitting comprises transmitting at least one sonic signal from a plurality of sonic transmitters, and step (b) of receiving comprises receiving signals from a plurality of sonic receivers for detecting the transmitted signal after interacting with the flow regulator.

11. An HVAC flow regulator monitoring system for monitoring an operating condition of a controllable flow regulator in a flow channel of an HVAC system, the monitoring system comprising:

a sonic transmitter for transmitting a sonic signal directly or indirectly to the flow regulator, and an electronic driver for driving the transmitter, the sonic signal being distinguished from background noise by being at least one of: (i) modulated according to a modulation schema; (ii) an ultrasonic signal; (iii) a frequency selected to be away from background noise;

a sonic receiver for detecting the transmitted signal after interacting with the flow regulator; and outputting a received signal; and an electronic signal processor coupled to the receiver, and responsive at least to the received signal, for determining the operating condition of the flow regulator;

wherein the operating condition is or comprises one or more of:

(i) a degree of fluid-tightness of the flow regulator when in a closed condition;

(ii) the presence or absence of a leakage path through the flow regulator when in a closed condition;

(iii) at least one of a closure state and a closed position of the flow regulator;

(iv) detection that the flow regulator is in a closed state;

(v) a physical position of a movable flow control member of the flow regulator:

(vi) evolution over time of the physical position of a movable flow control member when cycled to the closed condition;

(vii) evolution over time of leak paths through the flow regulator when cycled to the closed condition;

(vii) an indication of where around a perimeter of a flow control member a leakage path is detected to exist, based on a time interval between emitting of the signal into the flow channel, and reception of the signal from the flow channel;

(vi) at least one of an amount of hysteresis in the flow regulator and an actuator of the flow regulator;

(vii) at least one of distortion and wear of a seal component of the flow regulator:

(viii) indication of at least one of a current and a forthcoming malfunction of at least one of the flow regulator and an actuator of the flow regulator;

(ix) the degree of intactness of a flow control member of the flow regulator:

(x) indication of foreign matter in the flow channel in the vicinity of the flow regulator selected from the group consisting of accumulation of deposits, contamination of the fluid, and pollution of the fluid;

(xi) a physical position of a movable vane of the flow regulator;

(xii) at least one of distortion and wear of at least one seal component of the flow regulator selected from the group consisting of a seal member, a seal seat, and a seal liner.

12. The monitoring system according to claim 11, wherein the sonic transmitter is positioned or positionable for transmitting the sonic signal into the flow channel on a first side of the flow regulator, and indirectly to the flow regulator via the flow channel.

13. The monitoring system according to claim 11, wherein the sonic receiver is positioned or positionable to receive a signal from the flow channel.

14. The monitoring system according to claim 13, wherein the sonic receiver is positioned or positionable to receive a signal from an opposite second side of the flow regulator, and the electronic signal processor is operable to process a signal therefrom as a component of the transmitted signal transiting the flow regulator.

15. The monitoring system according to claim 11, further comprising an output interface for generating an indication of at least one of a current and a forthcoming malfunction responsive at least partly to the operating condition.

16. The monitoring system according to claim 11, comprising at least one of a plurality of said transmitters and a plurality of said receivers.

17. An HVAC flow regulator actuator for actuating a flow regulator for regulating flow in a flow channel of an HVAC system, the actuator comprising:

an electro-mechanical driver for driving movement of an actuator member, for actuating the flow regulator; and controller circuitry comprising:

at least one output coupled to the electro-mechanical driver for commanding operation of the electro-mechanical driver; and at least one input for receiving an input signal from a sonic receiver for receiving a sonic signal from at least one of the flow channel and the flow regulator;

wherein the controller circuitry is operable to:

identify whether the input signal comprises a component corresponding to at least one of a predetermined modulation schema and an ultrasonic signal component, wherein the ultrasonic signal component carries digitally coded information;

the digitally coded information comprises a reference bit sequence; and auto-correlation values for all non-zero shifts of the reference bit sequence do not exceed 25% of an auto-correlation value at zero shift, and in response to the identification step, determine an operating condition associated with at least one of the flow regulator and the actuator.

18. The actuator according to claim 17, wherein the control circuitry is absent an input for receiving a signal indicative of a fully-closed position of the flow regulator.

19. The method according to claim 1, wherein the transmitted signal is an ultrasonic signal-.

20. The method according to claim 1, wherein the transmitted signal is modulated according to a modulation schema, the modulation schema comprising at least one of: frequency modulation; amplitude modulation; a coded pattern of signal bursts; phase keying; and phase modulation.

21. A method of detecting an operating condition of a controllable flow regulator in a fluid flow channel of an HVAC system, the method comprising the steps of:

(a) transmitting a sonic signal, from a sonic transmitter, directly or indirectly to the flow regulator, the sonic signal being distinguished from background noise by being (i) modulated according to a modulation schema and (ii) an ultrasonic signal;

(b) receiving a signal from a sonic receiver for detecting the transmitted signal after interacting with the flow regulator; and (c) determining, in an electronic signal processor, the operating condition of the flow regulator on the basis of at least the signal received in the receiving step (b);

wherein the modulated signal carries a digitally coded information;

the digitally coded information comprises a reference bit sequence; and auto-correlation values for all non-zero shifts of the reference bit sequence do not exceed 25% of an auto-correlation value at zero shift.

22. The method according to claim 21, wherein the step (c) of determining comprises the steps of determining a multitude of cross-correlation values between the signal received in the receiving step (b) and the reference bit sequence, wherein each cross-correlation value in the multitude of cross-correlation values is determined at a different shift; and generating an indication of at least one of a current and a forthcoming malfunction, if a maximum cross-correlation value of the multitude of cross-correlation values exceeds a pre-defined cross-correlation value threshold.

23. A method of detecting an operating condition of a controllable flow regulator in a fluid flow channel of an HVAC system, the method comprising the steps of:

(a) transmitting a sonic signal, from a sonic transmitter, directly or indirectly to the flow regulator, the sonic signal being distinguished from background noise by being at least one of: (i) modulated according to a modulation schema, (ii) an ultrasonic signal, (iii) a frequency selected to be away from background noise;

(b) receiving a signal from a sonic receiver for detecting the transmitted signal after interacting with the flow regulator; and (c) determining, in an electronic signal processor, the operating condition of the flow regulator on the basis of at least the signal received in the receiving step (b);

wherein the received signal is processed to determine one or more of:

presence or absence of the transmitted signal in a signal received from the flow channel;

(ii) an amplitude of the received signal;

(iii) a comparison of the received signal, and at least one threshold;

(iv) a degree of attenuation of the received signal compared to the transmitted signal, as the flow regulator cycles between an open condition and a closed condition;

(v) at least one of a time interval and time of flight, between transmission of the signal into the flow channel, and reception of the transmitted signal from the flow channel;

(vi) at least one of a respective phase, phase difference, and phase range for a plurality of phase-distributed signal components received from the flow channel;

(vii) a respective signal to noise ratio for each of a plurality of different operating frequency channels;

(viii) a measurement of noise different from the transmitted signal;

(ix) a comparison of the received signal, and at least one threshold for discriminating between fluid-tight and non-fluid-tight conditions;

(x) a comparison of the received signal, and at least one threshold for discriminating between obstructed and unobstructed flow path conditions;

(xi) a respective signal to noise ratio for each of a plurality of different operating frequency channels for selecting between operating frequency channels in situ.

* * * * *